United States Patent
Jung et al.

(10) Patent No.: US 11,809,737 B2
(45) Date of Patent: Nov. 7, 2023

(54) STORAGE DEVICE FOR PERFORMING HIGH-SPEED LINK STARTUP AND STORAGE SYSTEM INCLUDING THE SAME

(71) Applicant: Samsung Electronics Co., Ltd., Suwon-si (KR)

(72) Inventors: Haesung Jung, Hwaseong-si (KR); Sungho Seo, Suwon-si (KR); Myungsub Shin, Suwon-si (KR); Seongyong Jang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 200 days.

(21) Appl. No.: 17/238,680

(22) Filed: Apr. 23, 2021

(65) Prior Publication Data

US 2022/0066689 A1 Mar. 3, 2022

(30) Foreign Application Priority Data

Aug. 25, 2020 (KR) .................. 10-2020-0107418

(51) Int. Cl.
*G06F 3/06* (2006.01)
*G06F 13/38* (2006.01)
*G06F 13/42* (2006.01)

(52) U.S. Cl.
CPC ............ *G06F 3/0655* (2013.01); *G06F 3/061* (2013.01); *G06F 3/0635* (2013.01); *G06F 3/0679* (2013.01); *G06F 13/385* (2013.01); *G06F 13/4278* (2013.01)

(58) Field of Classification Search
CPC ..................................................... Y02B 70/30
See application file for complete search history.

(56) References Cited

U.S. PATENT DOCUMENTS

| 8,621,128 | B2* | 12/2013 | Radulescu ............ G06F 13/385 370/437 |
| 9,684,361 | B2 | 6/2017 | Park et al. |
| 10,181,975 | B2 | 1/2019 | Chellappan |
| 10,572,427 | B2 | 2/2020 | Rosensprung et al. |

(Continued)

OTHER PUBLICATIONS

Partial European Search Report dated Nov. 23, 2021 issued in corresponding European Appln. No. 21173286.2.

(Continued)

*Primary Examiner* — Henry Tsai
*Assistant Examiner* — Juanito C Borromeo
(74) *Attorney, Agent, or Firm* — Harness, Dickey & Pierce, P.L.C.

(57) ABSTRACT

Provided are a storage device configured to perform high-speed link startup and a storage system including the storage device. The storage system performs data communication through a connected transmission lane and a connected reception lane from among a plurality of lanes between a host and the storage device. The host transmits an activate period of the connected transmission lane, which is less than a first time period, to the connected reception lane, and the storage device receives the activate period of the connected reception lane, which is less than the first time period. The host and the storage device perform link startup in a high-speed mode through the connected transmission lane and the connected reception lane, based on the activate period being less than the first time period.

20 Claims, 22 Drawing Sheets

(56) References Cited

U.S. PATENT DOCUMENTS

| | | |
|---|---|---|
| 10,635,450 B2 | 4/2020 | Lee et al. |
| 2003/0223486 A1 | 12/2003 | Hsu |
| 2017/0116150 A1 | 4/2017 | Wiley |
| 2017/0176534 A1 | 6/2017 | Chellappan et al. |
| 2017/0181081 A1* | 6/2017 | Kim .................... H04B 1/0483 |
| 2019/0303024 A1 | 10/2019 | Iwai et al. |

OTHER PUBLICATIONS

Jedec Standard, "Universal Flash Storage (UFS)", Version 3.0, JESD220D (Revision of JESD220C, Mar. 2016) Jan. 2018.
Mipi alliance "Specification for M-PHY", Version 4.1—Dec. 1, 2016, MIPI Board Adopted Mar. 28, 2017.
Mipi alliance "Specification for Unified Protocol", Version 1.8 Sep. 13, 2017, MIPI Board Adopted Jan. 11, 2018.

* cited by examiner

STORAGE DEVICE FOR PERFORMING HIGH-SPEED LINK STARTUP AND STORAGE SYSTEM INCLUDING THE SAME

CROSS-REFERENCE TO RELATED APPLICATION

This application is based on and claims priority under 35 U.S.C. § 119 to Korean Patent Application No. 10-2020-0107418, filed on Aug. 25, 2020, in the Korean Intellectual Property Office, the disclosure of which is incorporated by reference herein in its entirety.

BACKGROUND

The inventive concepts relate to apparatuses and methods, and more particularly, to a storage device for performing high-speed link startup and a storage system including the storage device.

A storage system may include a host and the storage device. The host may be connected to the storage device through various standard interfaces such as Universal Flash Storage (UFS), Serial ATA (SATA), Small Computer Small Interface (SCSI), Serial Attached SCSI (SAS), and embedded Multi-Media Card (eMMC). When storage systems are used in mobile devices, a higher-speed operation between the host and the storage device is advantageous and quicker link startup between the host and the storage device may be advantageous, as well.

SUMMARY

According to an aspect of the inventive concepts, there is provided a method of link startup of a device including a plurality of lanes, the method including: setting up data communication through a connected transmission lane and a connected reception lane from among the plurality of lanes; setting a length of an activate period, in which a line of the connected transmission lane has a negative differential line voltage (DIF-N), to be less than a first time period; transmitting, by the connected transmission lane, the activate period being less than the first time period to the connected reception lane; receiving, by the connected reception lane, the activate period being less than the first time period; and performing link startup in a high-speed mode through the connected transmission lane and the connected reception lane, based on the activate period being less than the first time period.

According to another aspect of the inventive concepts, there is provided a method of link startup between a first device and a second device, which are connected to each other through a plurality of lanes, the method including: transitioning, by the first device, a line of at least one of the plurality of lanes from a zero differential line voltage (DIF-Z) state to a negative differential line voltage (DIF-N) state; monitoring, by the second device, whether there is a lane transited from the DIF-Z state to the DIF-N state; recognizing, by the second device, a connected lane transited from the DIF-Z state to the DIF-N state, as a result of the monitoring; and performing the link startup between the first device and the second device in a high-speed mode, as the connected lane is recognized.

According to yet another aspect of the inventive concepts, there is provided a device including: an interface configured to transmit and receive data through an interconnect unit to which a plurality of lanes are connected; a plurality of transmitters included in the interconnect unit, at least one of the plurality of transmitters being configured to perform data communication through a connected transmission lane and a connected reception lane from among the plurality of lanes and transmit an activate period of the connected transmission lane, which is less than a first time period, to the connected reception lane, and a line of the connected transmission lane, in the activate period, having a negative differential line voltage (DIF-N); and a plurality of receivers included in the interconnect unit, wherein the device is configured to perform link startup in a high-speed mode through the connected transmission lane and the connected reception lane, based on the activate period being less than the first time period.

According to yet another aspect of the inventive concepts, there is provided a device including: an interface configured to transmit and receive data through an interconnect unit to which a plurality of lanes are connected; a plurality of receivers included in the interconnect unit, at least one of the plurality of receivers being configured to perform data communication through a connected transmission lane and a connected reception lane from among the plurality of lanes and receive an activate period of the connected reception lane, which is less than a first time period, and a line of the connected reception lane, in the activate period, having a negative differential line voltage (DIF-N); and a plurality of transmitters included in the interconnect unit, wherein the device is configured to perform link startup in a high-speed mode through the connected transmission lane and the connected reception lane, based on the activate period being less than the first time period.

According to yet another aspect of the inventive concepts, there is provided a device including: an interface including an interconnect unit to which a plurality of lanes are connected, the interface being configured to perform data communication through a connected transmission lane and a connected reception lane from among the plurality of lanes; a plurality of receivers included in the interconnect unit, the plurality of receivers being configured to monitor whether there is a connected reception lane from among the plurality of lanes and recognize that there is the connected reception lane as a result of the monitoring, and a line of the connected reception lane transitioning from a zero differential line voltage (DIF-Z) to a negative differential line voltage (DIF-N); and a plurality of transmitters included in the interconnect unit, wherein the device is configured to perform link startup in a high-speed mode through the connected transmission lane and the connected reception lane, as the connected reception lane is recognized.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Figure 1:
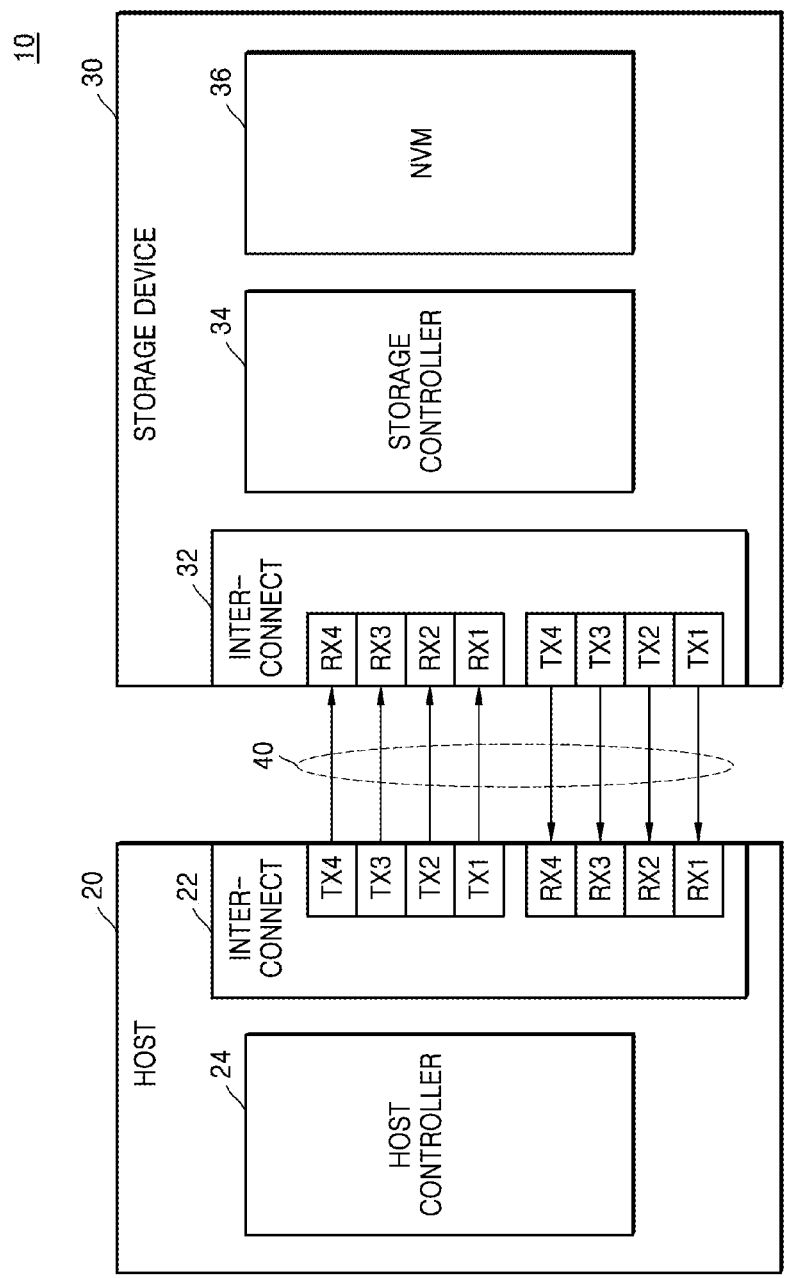
FIG. 1 is a block diagram illustrating a storage system according to example embodiments of the inventive concepts.

FIG. 1 is a block diagram illustrating a storage system according to example embodiments of the inventive concepts.

Referring to FIG. 1, a storage system 10 may include a host 20 and/or a storage device 30. The host 20 and the storage device 30 may be connected to each other according to an interface protocol defined in the Universal Flash Storage (UFS) specification, and thus, the storage device 30 may include a UFS storage device and the host 20 may include a UFS host. However, the inventive concepts are not limited thereto, and the storage device 30 and the host 20 may be connected to each other according to various standard interfaces.

The host 20 may control a data processing operation, for example, a data read operation, a data write operation, or the like, with respect to the storage device 30. The host 20 may refer to a data processing device capable of processing data, such as a central processing unit (CPU), a processor, a microprocessor, or an application processor (AP). The host 20 may execute an operating system (OS) and/or various applications. In example embodiments, the storage system 10 may be included in a mobile device, and the host 20 may be implemented by an AP. In an embodiment, the host 20 may be implemented by a system-on-a-chip (SoC) and thus be embedded in an electronic device.

In some example embodiments, the host 20 may include an interconnect unit 22 and/or a host controller 24. The interconnect unit 22 may provide an interface 40 between the host 20 and the storage device 30. The interconnect unit 22 may include a physical layer and a link layer. The physical layer of the interconnect unit 22 may include physical components for exchanging data with the storage device 30 and may also include at least one transmitter TX, at least one receiver RX, and/or the like. The interconnect unit 22 of the host 20 may include, for example, four transmitters TX1 to TX4 and four receivers RX1 to RX4. The link layer of the interconnect unit 22 may manage transmission and composition of data and may also manage the integrity and errors of data.

The storage device 30 may include an interconnect unit 32, a storage controller 34, and/or a non-volatile memory 36. The storage controller 34 may control the non-volatile memory 36 to write data to the non-volatile memory 36, in response to a write request from the host 20, or may control the non-volatile memory 36 to read data stored in the non-volatile memory 36, in response to a read request from the host 20.

The interconnect unit 32 may provide the interface 40 between the storage device 30 and the host 20. For example, the interconnect unit 32 may include a physical layer and a link layer. The physical layer of the interconnect unit 32 may include physical components for exchanging data with the host 20 and may also include at least one receiver RX, at least one transmitter TX, and/or the like. The interconnect unit 32 of the storage device 30 may include, for example, four receivers RX1 to RX4 and four transmitters TX1 to TX4. The link layer of the interconnect unit 32 may manage transmission and composition of data and may also manage the integrity and errors of data.

In example embodiments, when the storage system 10 is a mobile device, the physical layers of the interconnect units 22 and 32 may be defined by the "M-PHY" specification, and the link layers thereof may be defined by the "UniPro" specification. M-PHY and UniPro are interface protocols proposed by the Mobile Industry Processor Interface (MIPI) alliance. Each of the link layers of the interconnect units 22 and 32 may include a physical adapted layer, and the physical adapted layer may control physical layers, such as management of a symbol of data, or management of power.

Figure 2:
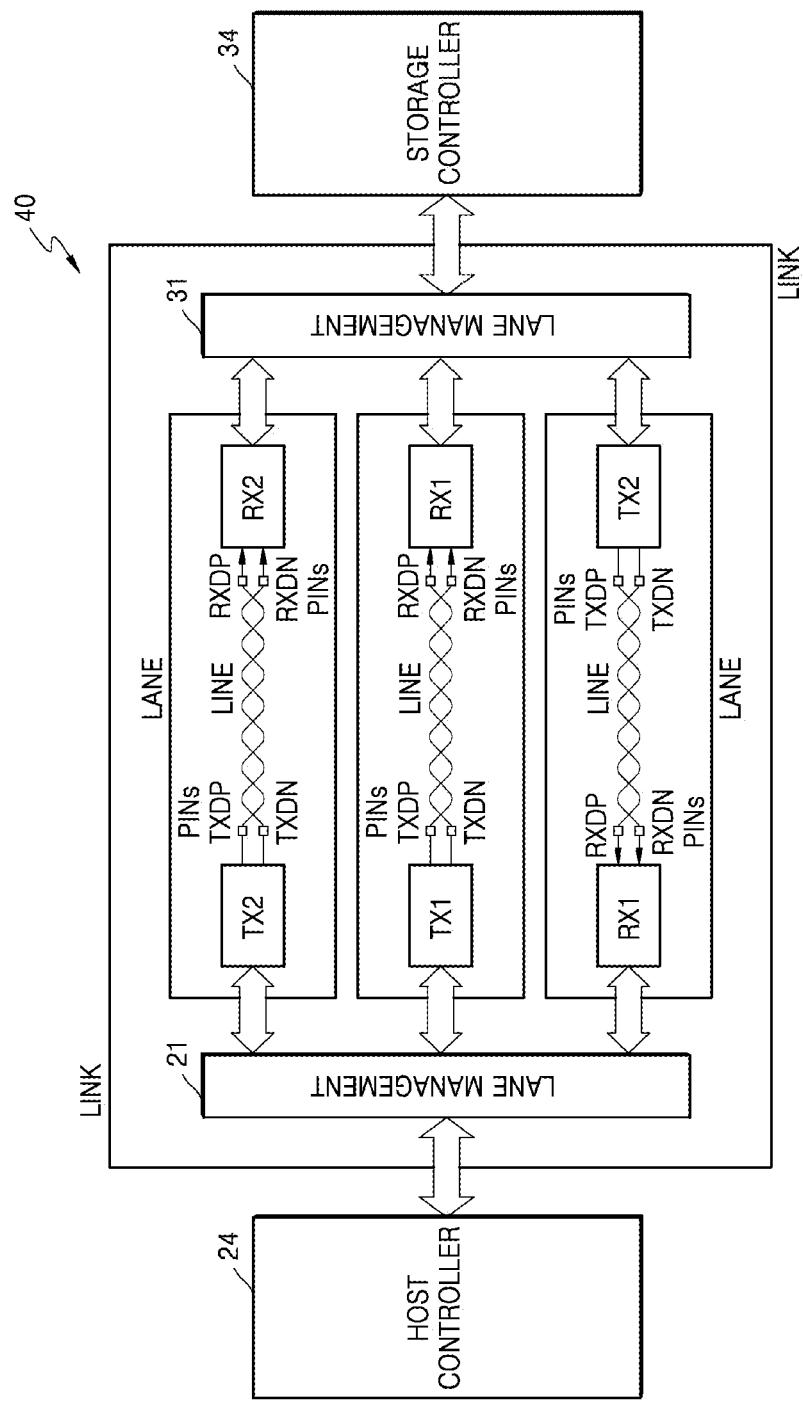
FIG. 2 is a diagram illustrating an interface between a host and a storage device of FIG. 1.

The transmitter TX included in the interconnect unit 22 of the host 20 and the receiver RX included in the interconnect unit 32 of the storage device 30 may form one lane, as shown in FIG. 2. In addition, the transmitter TX included in the interconnect unit 32 of the storage device 30 and the receiver RX included in the interconnect unit 22 of the host 20 may also form one lane. In some example embodiments, it is shown that the numbers of transmitters TX1 to TX4 and receivers RX1 to RX4 included in the interconnect unit 22 of the host 20 are respectively equal to the numbers of receivers RX1 to RX4 and transmitters TX1 to TX4 included in the interconnect unit 32 of the storage device 30. According to example embodiments, the numbers of transmitters and receivers included in the interconnect unit 22 of the host 20 may be respectively different from the numbers of transmitters and receivers included in the interconnect unit 32 of the storage device 30. In addition, the capability of the host 20 may be different from the capability of the storage device 30.

Each of the host 20 and the storage device 30 may recognize a physically connected lane and may perform processing for receiving information of the counterpart device, such as link startup. The host 20 and the storage device 30 may perform a link startup sequence, before exchanging data. By performing the link startup sequence, the host 20 and the storage device 30 may exchange information about the respective numbers of transmitters and receivers, information about the physically connected lane, information about the capability and/or the like of the counterpart device, and the like with each other and recognize such information. After the link startup sequence is completed, the host 20 and the storage device 30 may be set to be in a linkup state in which the host 20 and the storage device 30 may stably exchange data with each other.

The link startup sequence may be performed during an initialization operation, which is performed when the storage system 10 is used first, or during a booting operation of the storage system 10. In addition, the link startup sequence may also be performed during an operation of recovering an error of the linkup state. Because the link startup sequence requires exchange of information about the host 20 and the storage device 30, it may take a long time to perform the link startup sequence. For example, when the storage device 30 performs the link startup sequence in a low-speed mode, it may take a longer time to perform a link startup operation. The link startup operation requiring a longer time period may deteriorate the capability of the storage system 10.

The host controller 24 may control the host 20 to perform data communication through a connected transmission lane and a connected reception lane from among a plurality of lanes included in the interconnect unit 22. The host controller 24 may issue an activate period of the connected transmission lane, which is less than a first time period, and may control the host 20 to enter a high-speed mode. The host controller 24 may issue an activate period greater than the first time period through the connected transmission lane and may control the host 20 to enter the low-speed mode. Accordingly, the host 20 may perform link startup between the host 20 and the storage device 30 in the high-speed mode or in the low-speed mode.

The storage controller 34 may perform data communication through a connected transmission lane and a connected reception lane from among a plurality of lanes included in the interconnect unit 32. The storage controller 34 may control the storage device 30 to enter the high-speed mode based on the activate period of the connected reception lane, which is less than the first time period, and to enter the low-speed mode based on the activate period of the connected reception lane, which is greater than the first time period. Accordingly, the storage device 30 may perform the link startup between the host 20 and the storage device 30 in the high-speed mode or in the low-speed mode.

The non-volatile memory 36 may include a plurality of memory cells, which include, for example, flash memory cells. In example embodiments, the plurality of memory cells may include NAND flash memory cells. However, the inventive concepts are not limited thereto, and in other example embodiments, the plurality of memory cells may include resistive memory cells such as resistive random access memory (RRAM), phase-change RAM (PRAM), or magnetic RAM (MRAM).

In some example embodiments, the storage device 30 may be implemented by a DRAMless device, and the DRAMless device may refer to a device including no DRAM cache. In some example embodiments, the storage controller 34 may not include a DRAM controller. For example, the storage device 30 may use a portion of the non-volatile memory 36 as a buffer memory.

In some example embodiments, the storage device 30 may include an internal memory that is embedded in an electronic device. For example, the storage device 30 may include an embedded UFS memory device, an embedded multi-media card (eMMC), or a solid state drive (SSD). However, the inventive concepts are not limited thereto, and the storage device 30 may include a non-volatile memory (for example, one-time programmable read-only memory (OTPROM), programmable ROM (PROM), erasable and programmable ROM (EPROM), electrically erasable and programmable ROM (EEPROM), mask ROM, flash ROM, or the like). In some example embodiments, the storage device 30 may include an external memory that is detachable from an electronic device. For example, the storage device 30 may include at least one of a UFS memory card, a Compact Flash (CF) card, a Secure Digital (SD) card, a Micro-SD card, a Mini-SD card, an extreme Digital (xD) card, or a Memory Stick.

The storage system 10 may be implemented by, for example, an electronic device, such as a personal computer (PC), a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book reader. In addition, the storage system 10 may also be implemented by various electronic devices, for example, a wearable device such as a wrist-watch or a head-mounted display (HMD).

FIG. 2 is a diagram illustrating the interface 40 between the host 20 and the storage device 30 of FIG. 1. Concepts of a lane LANE, a line LINE, and a link LINK in the interface 40 of FIG. 2 will be described. Hereinafter, for convenience of description, among the plurality of transmitters and the plurality of receivers included in the interconnect units 22 and 32 of FIG. 1, the transmitter TX1 of the interconnect unit 22 of the host 20 and the receiver RX1 of the interconnect unit 32 of the storage device 30 will be representatively described.

Referring to FIG. 2, the interface 40 may support a plurality of lanes LANE. Each lane LANE is a unidirectional, single-signal, and information-carrying transmission channel. The lane LANE may include the transmitter TX1, the receiver RX1, and the line LINE providing point-to-point interconnection between the transmitter TX1 and the receiver RX1. The transmitter TX1 or the receiver RX1 has one differential output or input line interface corresponding to two signaling pins PIN. The pins PIN are individually denoted by DP representing a positive node of a differential signal and DN representing a negative node of a differential signal. TX or RX, which is a selective prefix, may be added to each of DP and DN of the pins PIN to represent a pin of the transmitter TX1 or a pin of the receiver RX1. The line LINE includes two differentially routed wires which connect the pins PIN of the transmitter TX1 and the receiver RX1 to each other. These wires are transmission lines.

The interface 40 includes at least one lane LANE in each direction. The number of lanes LANE in each direction does not need to be symmetric. The link LINK may include, in each direction, one or more lanes LANE and lane management units 21 and 31 providing a bidirectional data transmission function. Although FIG. 2 illustrates that the lane management units 21 and 31 are respectively separated from the controllers 24 and 34, the inventive concepts are not limited thereto, and the lane management units 21 and 31 may be respectively included in the controllers 24 and 34.

Figure 3:
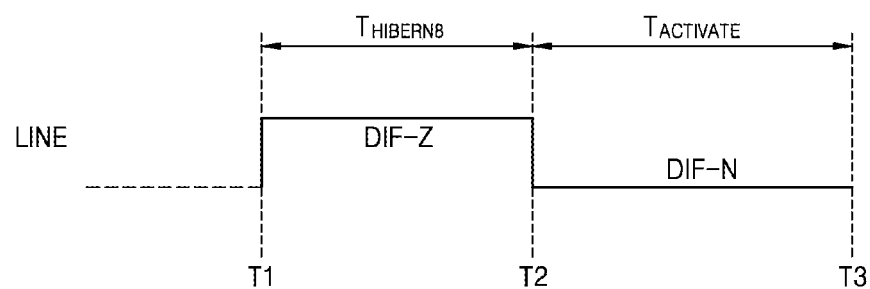
FIG. 3 is a diagram illustrating a state of a line of FIG. 2.

FIG. 3 is a diagram illustrating a state of the line LINE of FIG. 2.

Referring to FIGS. 2 and 3, the line LINE may be in a DIF-Z state of having an almost zero differential line voltage or in a DIF-N state of having a negative differential line voltage. Alternatively, although not shown in FIG. 3, the line LINE may be in one of a DIF-P state of having a positive differential line voltage, a DIF-Q state representing a high impedance state, and a DIF-X state that is neither the DIF-N state nor the DIF-P state. In some example embodiments, a differential line voltage may be defined as a value obtained by subtracting a voltage of a line connected to a negative node from a voltage of a line connected to a positive node.

In the line LINE between the transmitter TX1 and the receiver RX1, while the transmitter TX1 is in a hibernation state (which is referred to as a "HIBERN8 state" hereinafter), which is a power saving state at ultra-low power, the receiver RX1 may maintain the line LINE in the DIF-Z state. During the DIF-Z state from a time point T1 to a time point T2, the line LINE is in the HIBERN8 state. A time period between the time point T1 and the time point T2 is referred to as a hibernation period $T_{HIBERN8}$.

At the time point T2, the transmitter TX1 may transit the line LINE to the DIF-N state to signal the exit from the HIBERN8 state. In some example embodiments, the receiver RX1 may detect the DIF-N state of the line LINE and may recognize that the links LINK on both sides of the transmitter TX1 and the receiver RX1 will be operational and will be in a state of having exited the HIBERN8 state. The time period between the time point T1 and the time point T2, in which the line LINE is in the DIF-N state, is referred to as an activate period $T_{ACTIVATE}$. In example embodiments, a length of the activate period $T_{ACTIVATE}$ may be less than about 0.9 ms. In example embodiments, the length of the activate period $T_{ACTIVATE}$ may be equal to or greater than about 0.9 ms.

For example, when the length of the activate period $T_{ACTIVATE}$ of the line LINE is less than 0.9 ms, the transmitter TX1 and the receiver RX1 may enter a high-speed mode HS-MODE, and the links LINK of both the transmitter TX1 and the receiver RX1 may perform a link startup operation in the high-speed mode HS-MODE. When the length of the activate period $T_{ACTIVATE}$ of the line LINE is equal to or greater than 0.9 ms, the transmitter TX1 and the receiver RX1 may enter a low-speed mode LS-MODE, and the links LINK on both sides of the transmitter TX1 and the receiver RX1 may perform the link startup operation in the low-speed mode LS-MODE. The low-speed mode LS-MODE may correspond to a pulse width modulation (PWM) mode. The link startup operation will be described below with reference to FIG. 7.

Figure 4:
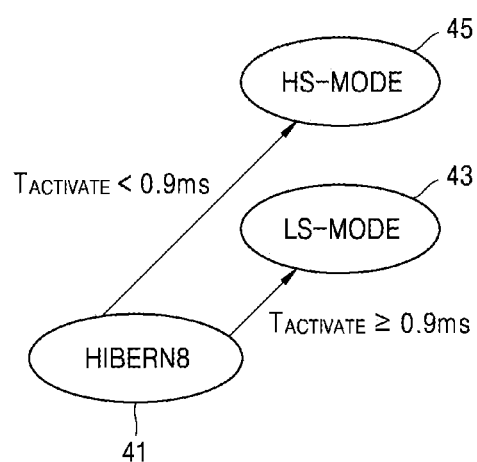
FIG. 4 is a state diagram according to a length of an activate period of a line, according to example embodiments of the inventive concepts.

FIG. 4 is a state diagram according to the length of the activate period $T_{ACTIVATE}$ of the line LINE, according to example embodiments of the inventive concepts.

Referring to FIGS. 2, 3, and 4, when the length of the activate period $T_{ACTIVATE}$ of the line LINE is less than 0.9 ms, the transmitter TX1 and the receiver RX1 may transit from a HIBERN8 state 41 to a high-speed mode state 45. When the length of the activate period $T_{ACTIVATE}$ of the line LINE is equal to or greater than 0.9 ms, the transmitter TX1 and the receiver RX1 may transit from the HIBERN8 state 41 to a low-speed mode state 43.

Figure 5:
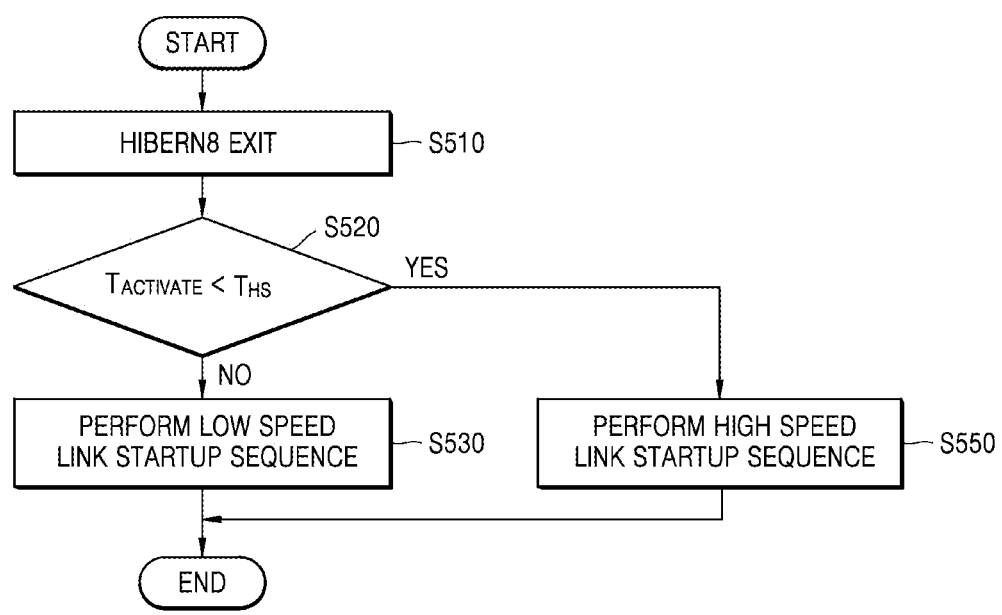
FIG. 5 is a flowchart illustrating a method of operating a storage system, according to example embodiments of the inventive concepts.

FIG. 5 is a flowchart illustrating a method of operating a storage system, according to example embodiments of the inventive concepts. FIG. 5 illustrates an operation of the host 20 in the storage system 10 of FIG. 1.

Referring to FIGS. 1, 2, and 5, in operation S510, the host 20 may exit the HIBERN8 state. The host 20 may transit the line LINE of the connected lane LANE from among the plurality of lanes LANE to the DIF-N state and exit the HIBERN8 state. The connected lane LANE refers to an available lane LANE from among the plurality of lanes LANE.

In operation S520, the host 20 may determine whether the length of the activate period $T_{ACTIVATE}$, in which the line LINE of the connected lane LANE is in the DIF-N state, is less than a first time period $T_{HS}$. The first time period $T_{HS}$ may be, for example, 0.9 ms. According to example embodiments, the first time period $T_{HS}$ may be set to be different from 0.9 ms. For example, the first time period $T_{HS}$ may have a value less than 0.9 ms and may also have a value (for example, 1.6 ms) greater than 0.9 ms.

As a result of the determination in operation S520, when the length of the activate period $T_{ACTIVATE}$ of the connected lane LANE is less than the first time period $T_{HS}$, the method proceeds to operation S550, and in operation S550, the host 20 may perform a link startup sequence LSS in the high-speed mode HS-MODE.

As a result of the determination in operation S520, when the length of the activate period $T_{ACTIVATE}$ of the connected lane LANE is equal to or greater than the first time period $T_{HS}$, the method proceeds to operation S530, and in operation S530, the host 20 may perform the link startup sequence LSS in the low-speed mode LS-MODE.

Figure 6:
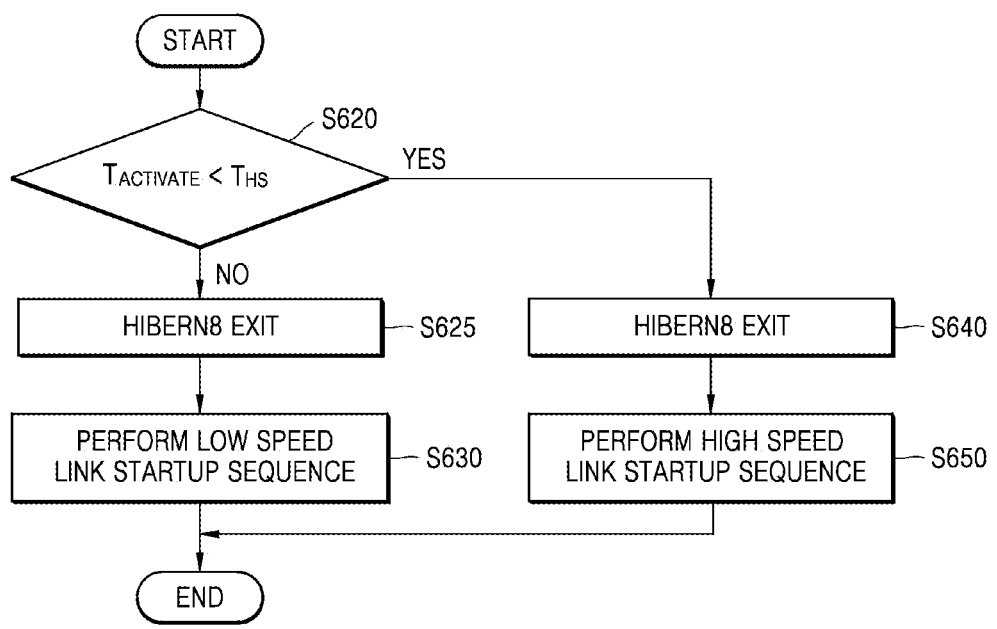
FIG. 6 is a flowchart illustrating a method of operating a storage system, according to example embodiments of the inventive concepts.

FIG. 6 is a flowchart illustrating a method of operating a storage system, according to example embodiments of the inventive concepts. FIG. 6 illustrates an operation of the storage device 30 in the storage system 10 of FIG. 1.

Referring to FIGS. 1, 2, and 6, in operation S620, the storage device 30 may determine whether the length of the activate period $T_{ACTIVATE}$, in which the line LINE of the connected lane LANE is in the DIF-N state, is less than the first time period $T_{HS}$. Before operation S620, the line LINE may be in a state that is not the DIF-N state, for example, in the DIF-Z state. The first time period $T_{HS}$ may be, for example, 0.9 ms. According to example embodiments, the first time period $T_{HS}$ may be set to be different from 0.9 ms. For example, the first time period $T_{HS}$ may have a value less than 0.9 ms and may also have a value (for example, 1.6 ms) greater than 0.9 ms.

As a result of the determination in operation S620, when the length of the activate period $T_{ACTIVATE}$ of the connected lane LANE is equal to or greater than the first time period $T_{HS}$, the method may proceed to operations S625 and S630. The storage device 30 may exit the HIBERN8 state in operation S625, and then, may perform the link startup sequence LSS in the low-speed mode LS-MODE in operation S630.

As a result of the determination in operation S620, when the length of the activate period $T_{ACTIVATE}$ of the connected lane LANE is less than the first time period $T_{HS}$, the method proceeds to operations S640 and S650. In operation S640, the storage device 30 may exit the HIBERN8 state. In some example embodiments, the storage device 30 may detect the DIF-N state of the line LINE, which has been transited by the host 20 for signaling the exit from the HIBERN8 state, and may exit the HIBERN8 state. In operation S650, the storage device 30 may perform the link startup sequence LSS in the high-speed mode HS-MODE.

Figure 7:
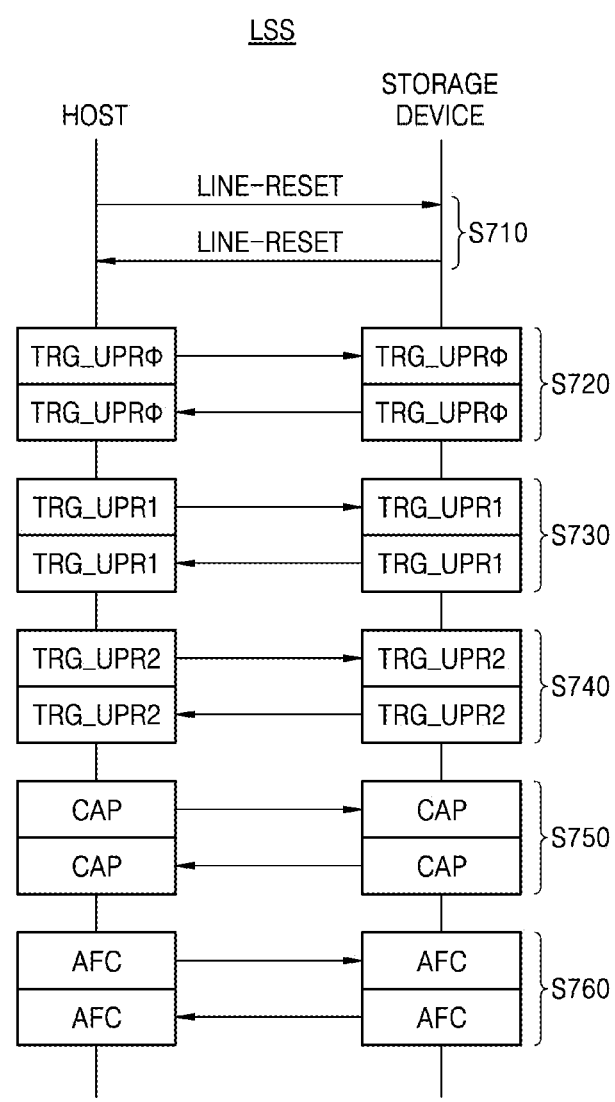
FIG. 7 is a flowchart illustrating a link startup sequence of FIGS. 5 and 6.

FIG. 7 is a flowchart illustrating the link startup sequence LSS of FIGS. 5 and 6. The link startup sequence LSS of FIG. 7 is performed in a multi-phase handshake manner in which UniPro trigger events for setting up initial link communication bidirectionally in connected lanes LANE, that is, available lanes LANE, are exchanged.

Referring to FIGS. 1, 2, and 7, in a phase S710, the host 20 may generate line reset LINE-RESET, may reset transmitters TX of the connected lanes LANE, and may transmit information indicating that the transmitters TX have been reset. The storage device 30 may receive the line reset LINE-RESET, may reset receivers RX of the connected lanes LANE, and may transmit information indicating that the receivers RX have been reset. The line reset LINE-RESET may be configured to reset or clear all attributes of physical layers of the interconnect units 22 and 32 to default values. The host 20 and the storage device 30 may exchange information about the line reset LINE-RESET with each other. The phase S710 may be referred to as a line reset phase S710. After the line reset phase S710 is performed, the link startup sequence LSS may be started.

The link startup sequence LSS may be defined by certain phases. The link startup sequence LSS may use a trigger event in each phase, and each trigger event may be transmitted several times.

In a first phase S720 of the link startup sequence LSS, the link startup sequence LSS may find the connected lanes LANE. To this end, the host 20 may transmit a first trigger event TRG_UPR0 through all transmission lanes LANE. The host 20 may continue to transmit the first trigger event TRG_UPR0 until the lanes LANE connected to the storage device 30, that is, available reception lanes LANE, receive a first trigger event message. The first trigger event TRG_UPR0 transmitted by the host 20 may include a physical lane number of a transmission lane LANE of the host 20, through which a corresponding trigger is transmitted.

In addition, in the first phase S720, the storage device 30 may transmit the first trigger event TRG_UPR0 through all transmission lanes LANE. The storage device 30 may continue to transmit the first trigger event TRG_UPR0 until the lanes LANE connected to the host 20, that is, available reception lanes LANE, receive the first trigger event message. The first trigger event TRG_UPR0 transmitted by the storage device 30 may include a physical lane number of a transmission lane LANE of the storage device 30, through which a corresponding trigger is transmitted.

In a second phase S730 of the link startup sequence LSS, the link startup sequence LSS may realign data lanes. To this end, the host 20 may transmit a second trigger event TRG_UPR1 through all the transmission lanes LANE. The host 20 may continue to transmit the second trigger event TRG_UPR1 until the lanes LANE connected to the storage device 30, that is, the available reception lanes LANE, receive a second trigger event message. The second trigger event TRG_UPR1 transmitted by the host 20 may include information about the transmission lanes LANE connected to the host 20.

In addition, in the second phase S730, the storage device 30 may transmit the second trigger event TRG_UPR1 through all the transmission lanes LANE. The storage device 30 may continue to transmit the second trigger event TRG_UPR1 until the lanes LANE connected to the host 20, that is, the available reception lanes LANE, receive the second trigger event message. The second trigger event TRG_UPR1 transmitted by the storage device 30 may include information about the transmission lanes LANE connected to the storage device 30.

In a third phase S740 of the link startup sequence LSS, the link startup sequence LSS may reflect, in attributes of the physical layers of the interconnect units 22 and 32, how many lanes LANE connected between the host 20 and the storage device 30, that is, the available lanes LANE, there are. To this end, the host 20 may transmit a third trigger event TRG_UPR2 through the connected transmission lanes LANE, that is, the available transmission lanes LANE. The host 20 may continue to transmit the third trigger event TRG_UPR2 until the reception lanes LANE connected to the storage device 30, that is, the available reception lanes LANE, receive a third trigger event message. The third trigger event TRG_UPR2 transmitted by the host 20 may include logical lane numbers regarding the transmission lanes LANE connected to the host 20.

In addition, in the third phase S740, the storage device 30 may transmit the third trigger event TRG_UPR2 through the transmission lanes LANE connected to the storage device 30, that is, the available transmission lanes LANE. The storage device 30 may continue to transmit the third trigger event TRG_UPR2 until the reception lanes LANE connected to the host 20, that is, the available reception lanes LANE, receive the third trigger event message. The third trigger event TRG_UPR2 transmitted by the storage device 30 may include logical lane numbers regarding the transmission lanes LANE connected to the storage device 30.

As the third phase S740 of the link startup sequence LSS is performed, the host 20 and the storage device 30 may have matched logical lane numbers regarding the available lanes LANE. At this point, the host 20 and the storage device 30 may terminate the link startup sequence LSS and perform capability exchange.

In a phase S750, to communicate architecture requirements of the interconnect units 22 and 32, the host 20 and the storage device 30 may exchange information about capability CAP of the counterpart device with each other and recognize the information. The architecture requirements of the interconnect units 22 and 32 may include, for example, bandwidths, timers, speed gears, termination/untermination, scrambling, and/or the like. The phase S750 may be referred to as a capability exchange phase S750. As the capability exchange phase S750 is performed, the information about the capability CAP of the counterpart device is collected by the interconnect units 22 and 32, and the attributes of the physical layers of the interconnect units 22 and 32 may be set according to the collected information about the capability CAP.

In a phase S760, to provide a reliable data link, the host 20 and the storage device 30 may exchange control frames AFC with each other. To this end, each of the host 20 and the storage device 30 may transmit an initial data frame to the counterpart device, and the device having received the data frame may transmit the control frame AFC back to the device having transmitted the data frame. The control frame AFC may be configured differently from the data frame, and the control frame AFC may be used to cause the transmission device to recognize that the data frame has been correctly received, and may also be used to notify a buffer space of an available data link layer.

Figure 8:
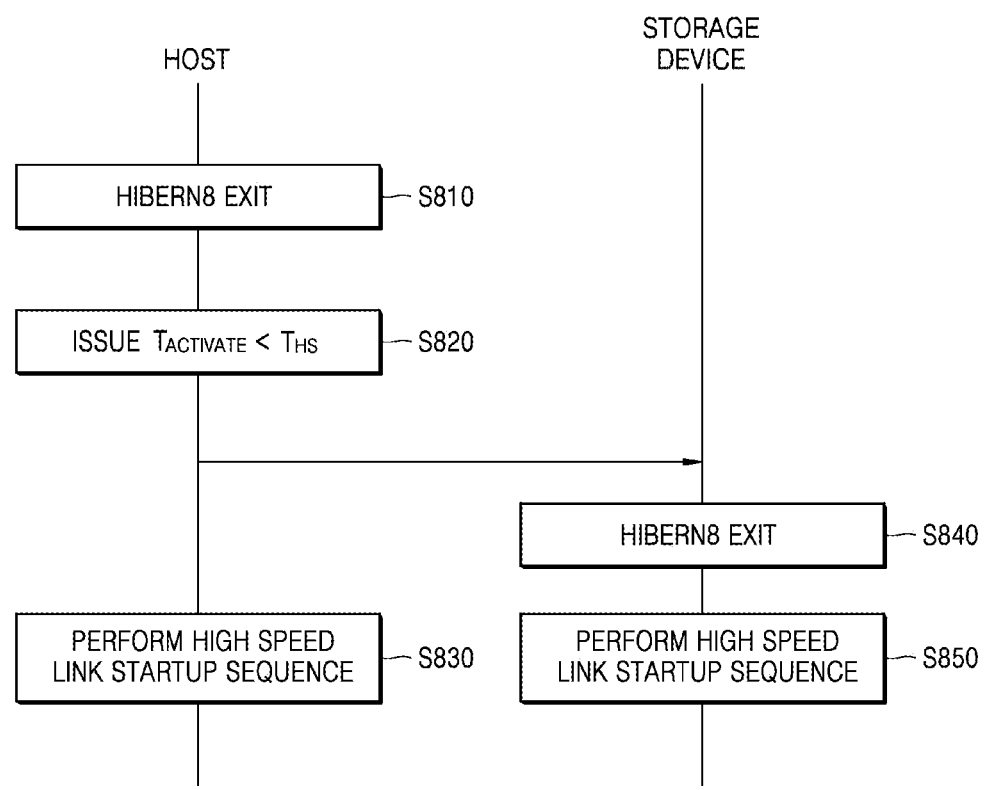
FIG. 8 is a flowchart illustrating a method of operating a storage system, according to example embodiments of the inventive concepts.

FIG. 8 is a flowchart illustrating a method of operating a storage system, according to example embodiments of the inventive concepts. FIG. 8 illustrates operations of the host 20 and the storage device 30 in the storage system 10 of FIG. 1.

Referring to FIG. 8, in operation S810, the host 20 may exit the HIBERN8 state. The host 20 may transit the line LINE of the connected transmission lane LANE from among the plurality of lanes LANE to the DIF-N state and may exit the HIBERN8 state.

In operation S820, the host 20 may issue the activate period $T_{ACTIVATE}$, in which the line LINE of the connected transmission lane LANE is in the DIF-N state, such that the length of the activate period $T_{ACTIVATE}$ is less than the first time period $T_{HS}$. After the host 20 issues the activate period $T_{ACTIVATE}$ such that the length of the activate period $T_{ACTIVATE}$ is less than the first time period $T_{HS}$, the host 20 may enter the high-speed mode HS-MODE. The first time period $T_{HS}$ may be, for example, 0.9 ms. According to example embodiments, the first time period $T_{HS}$ may be set to be different from 0.9 ms. For example, the first time period $T_{HS}$ may have a value less than 0.9 ms and may also have a value (for example, 1.6 ms) greater than 0.9 ms.

The host 20 may transmit the activate period $T_{ACTIVATE}$ of the connected transmission lane LANE, which is less than the first time period $T_{HS}$, to the reception lane LANE connected to the storage device 30. The storage device 30 may identify that the length of the activate period $T_{ACTIVATE}$ of the connected transmission lane LANE is less than the first time period $T_{HS}$, may exit the HIBERN8 state in operation S840, and then, may enter the high-speed mode HS-MODE.

In operations S830 and S850, the host 20 and the storage device 30 may perform the link startup sequence LSS, which has been described with reference to FIG. 7, in the high-speed mode HS-MODE. The link startup sequence LSS may include, for example, line reset, exchange of trigger events, capability information exchange, control frame exchange, and/or the like. In operations S830 and S850, after the performance of the link startup sequence LSS in the high-speed mode HS-MODE is completed, the host 20 and the storage device 30 may each be set to a linkup state that allows the host 20 and the storage device 30 to stably exchange data with each other.

Figure 9:
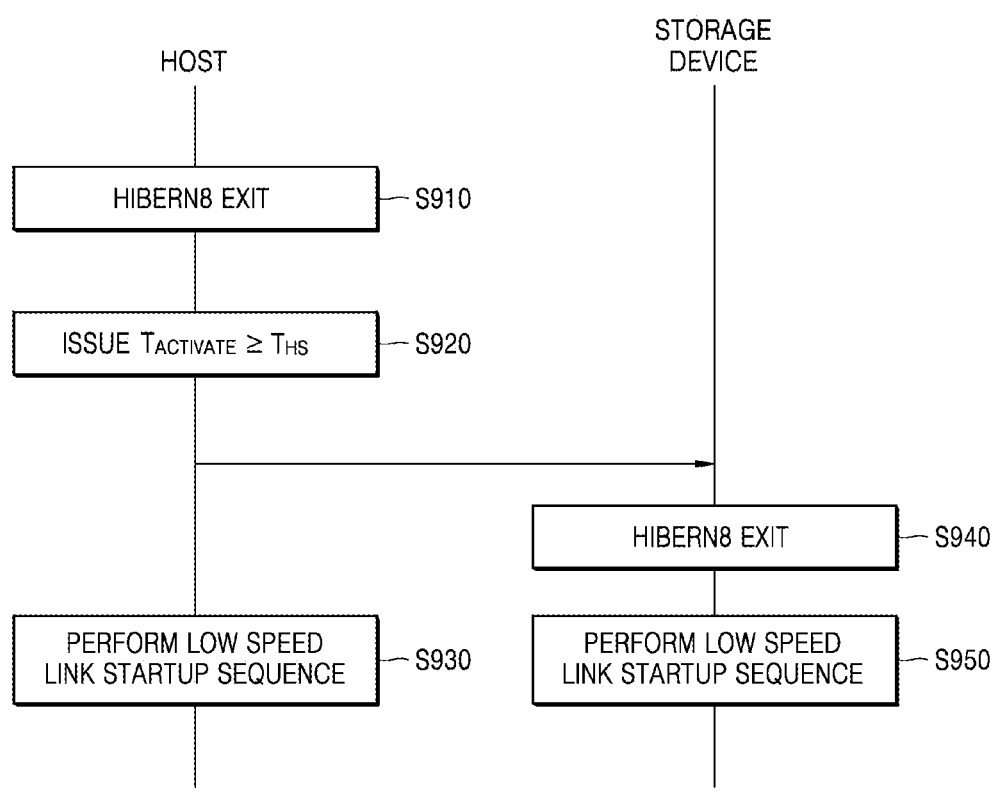
FIG. 9 is a flowchart illustrating a method of operating a storage system, according to example embodiments of the inventive concepts.

FIG. 9 is a flowchart illustrating a method of operating a storage system, according to example embodiments of the inventive concepts. FIG. 9 illustrates operations of the host 20 and the storage device 30 in the storage system 10 of FIG. 1.

Referring to FIG. 9, in operation S910, the host 20 may exit the HIBERN8 state. The host 20 may transit the line LINE of the connected transmission lane LANE from among the plurality of lanes LANE to the DIF-N state and may exit the HIBERN8 state.

In operation S920, the host 20 may issue the activate period $T_{ACTIVATE}$, in which the line LINE of the connected transmission lane LANE is in the DIF-N state, such that the length of the activate period $T_{ACTIVATE}$ is equal to or greater than the first time period $T_{HS}$. After the host 20 issues the activate period $T_{ACTIVATE}$ of the connected transmission lane LANE such that the length of the activate period $T_{ACTIVATE}$ is equal to or greater than the first time period $T_{HS}$, the host 20 may enter the low-speed mode LS-MODE. The first time period $T_{HS}$ may be, for example, 0.9 ms. According to example embodiments, the first time period $T_{HS}$ may be set to be different from 0.9 ms.

The host 20 may transmit the activate period $T_{ACTIVATE}$ of the connected transmission lane LANE, which is equal to or greater than the first time period $T_{HS}$, to the reception lane LANE connected to the storage device 30. The storage device 30 may recognize that the length of the activate period $T_{ACTIVATE}$ of the connected transmission lane LANE is equal to or greater than the first time period $T_{HS}$, may exit the HIBERN8 state in operation S940, and then, may enter the low-speed mode LS-MODE.

In operations S930 and S950, the host 20 and the storage device 30 may perform the link startup sequence LSS, which has been described with reference to FIG. 7, in the low-speed mode LS-MODE. The link startup sequence LSS may include, for example, the line reset, the exchange of trigger events, the capability information exchange, the control frame exchange, and/or the like. In operations S930 and S950, after the performance of the link startup sequence LSS in the low-speed mode LS-MODE is completed, the host 20 and the storage device 30 may each be set to the linkup state that allows the host 20 and the storage device 30 to stably exchange data with each other.

Figure 10:
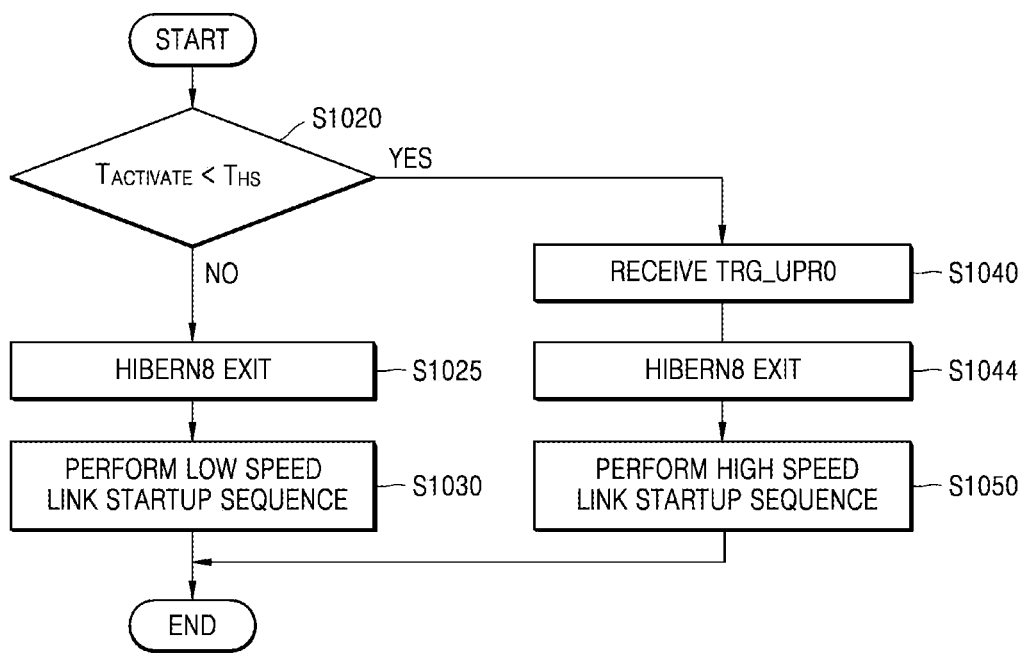
FIG. 10 is a flowchart illustrating a method of operating a storage system, according to example embodiments of the inventive concepts.

FIG. 10 is a flowchart illustrating a method of operating a storage system, according to example embodiments of the inventive concepts. FIG. 10 illustrates a method of operating the storage device 30 in the storage system 10 of FIG. 1, and this method is an example substituting for the method of operating the storage device 30, which has been described with reference to FIG. 6.

Referring to FIGS. 1, 2, and 10, in operation S1020, the storage device 30 may determine whether the length of the activate period $T_{ACTIVATE}$, in which the line LINE of the connected lane LANE is in the DIF-N state, is less than the first time period $T_{HS}$. Before operation S1020, the line LINE of the connected lane LANE may be, for example, in the DIF-Z state, rather than in the DIF-N state. The first time period $T_{HS}$ may be, for example, 0.9 ms. According to example embodiments, the first time period $T_{HS}$ may be set to be different from 0.9 ms. For example, the first time period $T_{HS}$ may have a value less than 0.9 ms and may also have a value (for example, 1.6 ms) greater than 0.9 ms.

As a result of the determination in operation S1020, when the length of the activate period $T_{ACTIVATE}$ of the connected lane LANE is equal to or greater than the first time period $T_{HS}$, the method proceeds to operations S1025 and S1030. The storage device 30 may exit the HIBERN8 state in operation S1025, and then, may perform the link startup sequence LSS in the low-speed mode LS-MODE in operation S1030.

As a result of the determination in operation S1020, when the length of the activate period $T_{ACTIVATE}$ of the connected lane LANE is less than the first time period $T_{HS}$, the method proceeds to operations S1040, S1044, and S1050. In operation S1040, the storage device 30 may receive the first trigger event TRG_UPR0 from the host 20 through the connected lane LANE. The first trigger event TRG_UPR0 may include a physical lane number of the transmission lane LANE of the host 20, through which a corresponding trigger is transmitted. When the first trigger event TRG_UPR0 is received, the storage device 30 may find the lane LANE connected to the storage device 30. The storage device 30 may exit the HIBERN8 state in operation S1044, and then, may perform the link startup sequence LSS in the high-speed mode HS-MODE in operation S1050.

Figure 11A:
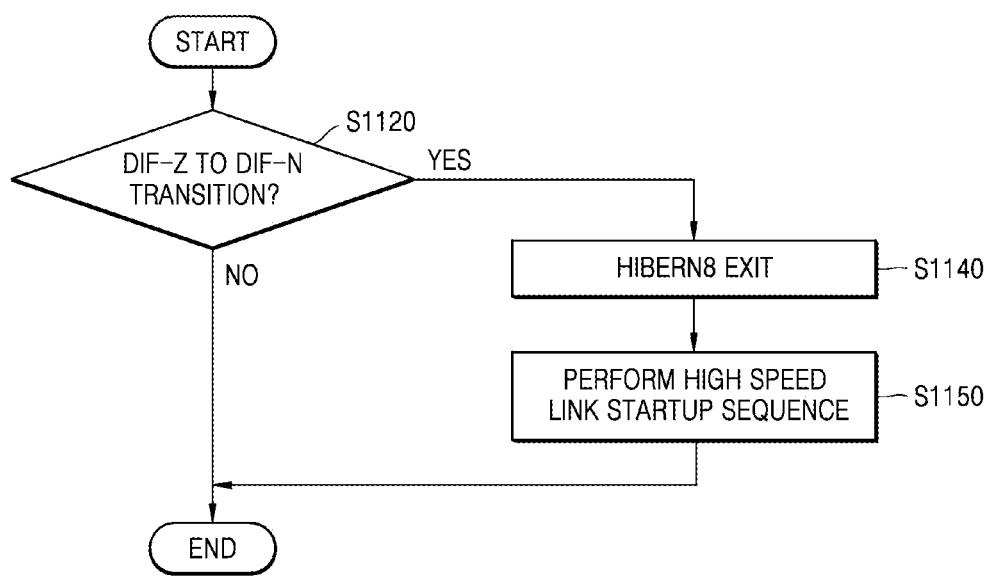
FIGS. 11A and 11B are flowcharts each illustrating a method of operating a storage system, according to example embodiments of the inventive concepts.
Figure 11B:
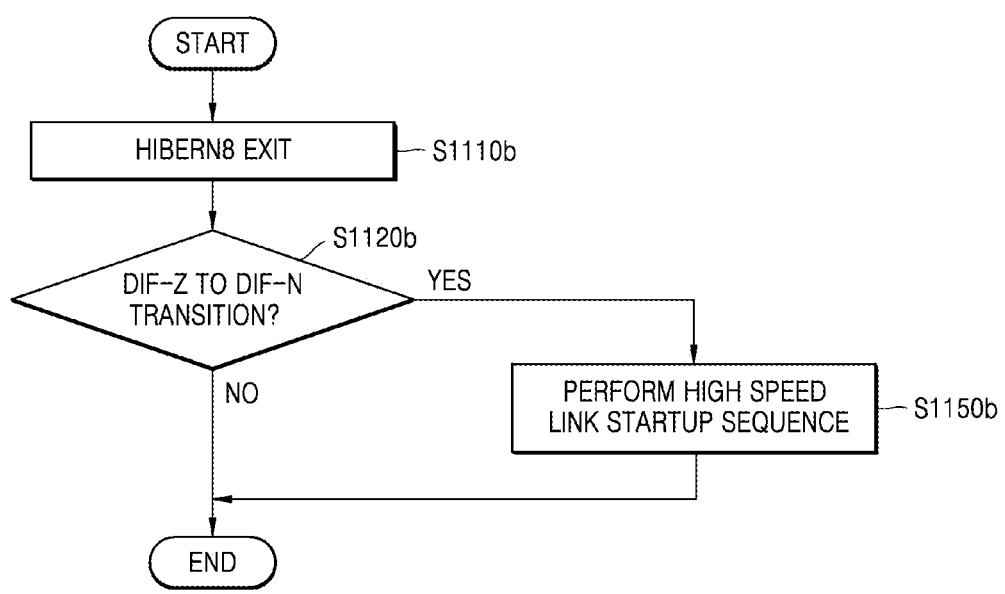

FIGS. 11A and 11B are flowcharts each illustrating a method of operating a storage system, according to example embodiments of the inventive concepts. FIGS. 11A and 11B each illustrate a method of operating the storage device 30 in the storage system 10 of FIG. 1, and these methods are examples substituting for the method of operating the storage device 30, which has been described with reference to FIG. 6.

Referring to FIGS. 1, 2, and 11A, in operation S1120, the storage device 30 may monitor whether the line LINE of any one lane LANE from among the plurality of lanes LANE transits from the DIF-Z state to the DIF-N state. That is, the storage device 30 may monitor whether there is a connected lane LANE among the plurality of lanes LANE.

As a result of the monitoring in operation S1120, when there is the connected lane LANE, the storage device 30 proceeds to operation S1140. In operation S1140, the storage device 30 may exit the HIBERN8 state. In some example embodiments, the storage device 30 may detect the DIF-N state of the line LINE, which has been transited by the host 20 to signal the exit from the HIBERN8 state, of the connected lane LANE, and may exit the HIBERN8 state.

In some example embodiments, the storage device 30 may exit the HIBERN8 state and start the transmission of the line reset LINE-RESET, in response to detecting that the host 20 exits the HIBERN8 state, without waiting for the time when the line LINE transited by the host 20 exits the DIF-N state (that is, the time when the host 20 terminates the activate period $T_{ACTIVATE}$ and starts to transmit the line reset LINE-RESET). Accordingly, because the storage device 30 is allowed to more quickly exit the HIBERN8 state, latency may be further reduced. When, while transmitting the line reset LINE-RESET, the storage device 30 detects that the line LINE transited by the host 20 exits the DIF-N state, the storage device 30 may recognize, as the length of the activate period $T_{ACTIVATE}$, a length of a time period in which the line LINE has been in the DIF-N state.

In operation S1150, the storage device 30 may recognize that there is the connected lane LANE, and may perform the link startup sequence LSS in the high-speed mode HS-MODE.

Referring to FIGS. 1, 2, and 11B, in operation S1110b, the storage device 30 may exit the HIBERN8 state in response to sensing that the host 20 exits the HIBERN8 state.

In operation S1120b, the storage device 30 may monitor whether the line LINE of any one lane LANE from among the plurality of lanes LANE transits from the DIF-Z state to the DIF-N state. That is, the storage device 30 may monitor whether there is a connected lane LANE among the plurality of lanes LANE.

As a result of the monitoring in operation S1120b, when there is the connected lane LANE, the storage device 30 proceeds to operation S1150b. In operation S1150b, the storage device 30 may recognize that there is the connected lane LANE, and may perform the link startup sequence LSS in the high-speed mode HS-MODE.

Figure 12:
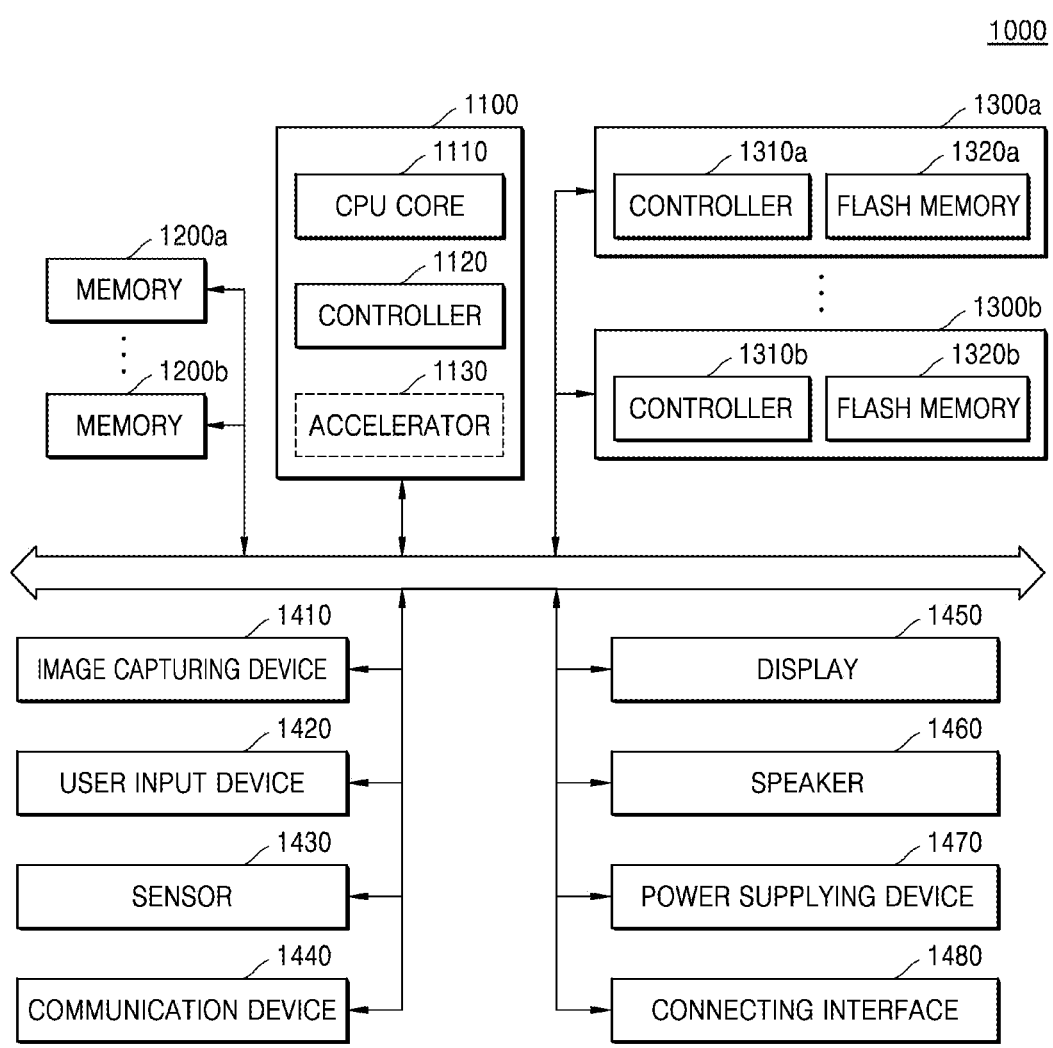
FIG. 12 is a diagram illustrating a system to which a storage device according to example embodiments of the inventive concepts is applied.

FIG. 12 is a diagram illustrating a system to which a storage device according to an example embodiments of the inventive concepts is applied. A system 1000 of FIG. 12 may basically include a mobile system such as a mobile phone, a smart phone, a tablet PC, a wearable device, a healthcare device, or an Internet-of-things (IoT) device. However, the system 1000 of FIG. 12 is not limited to the mobile system and may also include a PC, a laptop computer, a server, a media player, or an automotive device such as a navigation device. Hereinafter, a letter (for example, a of 1200a, or a of 1300a) added to the ends of reference numerals is for distinguishing a plurality of circuits performing the same function from each other.

Referring to FIG. 12, the system 1000 may include a main processor 1100, memories 1200a and 1200b, and/or storage devices 1300a and 1300b and may additionally include one or more of an image capturing device 1410, a user input device 1420, a sensor 1430, a communication device 1440, a display 1450, a speaker 1460, a power supplying device 1470, and/or a connecting interface 1480.

The main processor 1100 may control overall operations of the system 1000, and more particularly, may control operations of other components constituting the system 1000. The main processor 1100 may be implemented by a general-purpose processor, a dedicated processor, an application processor, or the like.

The main processor 1100 may include one or more CPU cores 1110 and may further include a controller 1120 for controlling the memories 1200a and 1200b and/or the storage devices 1300a and 1300b. According to example embodiments, the main processor 1100 may further include an accelerator block 1130, which is a dedicated circuit for high-speed data calculations such as artificial intelligence (AI) data calculations. The accelerator block 1130 may include a graphics processing unit (GPU), a neural processing unit (NPU), and/or a data processing unit (DPU), and may be implemented by a separate chip that is physically independent of the other components.

The memories 1200a and 1200b may be used as a main memory device and may include volatile memory such as SRAM and/or DRAM or may include non-volatile memory such as PRAM and/or RRAM. The memories 1200a and 1200b may also be implemented in the same package as the main processor 1100.

The storage devices 1300a and 1300b may function as non-volatile storage devices storing data regardless of the supply or not of power, and may have relatively larger storage capacities than the memories 1200a and 1200b. The storage devices 1300a and 1300b may include storage controllers 1310a and 1310b, and non-volatile memory (NVM) storages 1320a and 1320b storing data under the control of the storage controllers 1310a and 1310b, respectively. The NVM storages 1320a and 1320b may include V-NAND flash memory having a 2-dimensional (2D) structure or a 3-dimensional (3D) structure or may include another type of non-volatile memory such as PRAM and/or RRAM.

The storage devices 1300a and 1300b may be included in the system 1000 while physically separated from the main processor 1100 or may be implemented in the same package as the main processor 1100. In addition, the storage devices 1300a and 1300b may have a form such as a memory card and thus may be detachably coupled to the other components of the system 1000 through an interface such as the connecting interface 1480 described below. The storage devices 1300a and 1300b may include, but are not limited to, devices to which standard specifications such as UFS are applied.

The image capturing device 1410 may capture still images or moving images and may include a camera, a camcorder, and/or a webcam.

The user input device 1420 may receive various types of data input by a user of the system 1000 and may include a touch pad, a keypad, a keyboard, a mouse, and/or a microphone.

The sensor 1430 may sense various physical quantities, which may be obtained from outside the system 1000, and may convert the sensed physical quantities into electrical signals. The sensor 1430 may include a temperature sensor, a pressure sensor, a luminance sensor, a position sensor, an acceleration sensor, a biosensor, and/or a gyroscope.

The communication device 1440 may perform transmission and reception of signals between the system 1000 and other devices outside the system 1000, according to various communication protocols. The communication device 1440 may include an antenna, a transceiver, and/or a modem.

The display 1450 and the speaker 1460 may function as output devices outputting visual information and auditory information to the user of the system 1000, respectively.

The power supplying device 1470 may appropriately convert power supplied by a battery (not shown) embedded in the system 1000 and/or by an external power supply and thus supply the converted power to each of the components of the system 1000.

The connecting interface 1480 may provide a connection between the system 1000 and an external device that is connected to the system 1000 and capable of exchanging data with the system 1000. The connecting interface 1480 may be implemented by various interfaces such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), a secure digital (SD) card interface, a multi-media card (MMC) interface, an embedded multi-media card (eMMC) interface, Universal Flash Storage (UFS), embedded Universal Flash Storage (eUFS), and a compact flash (CF) card interface.

Figure 13:
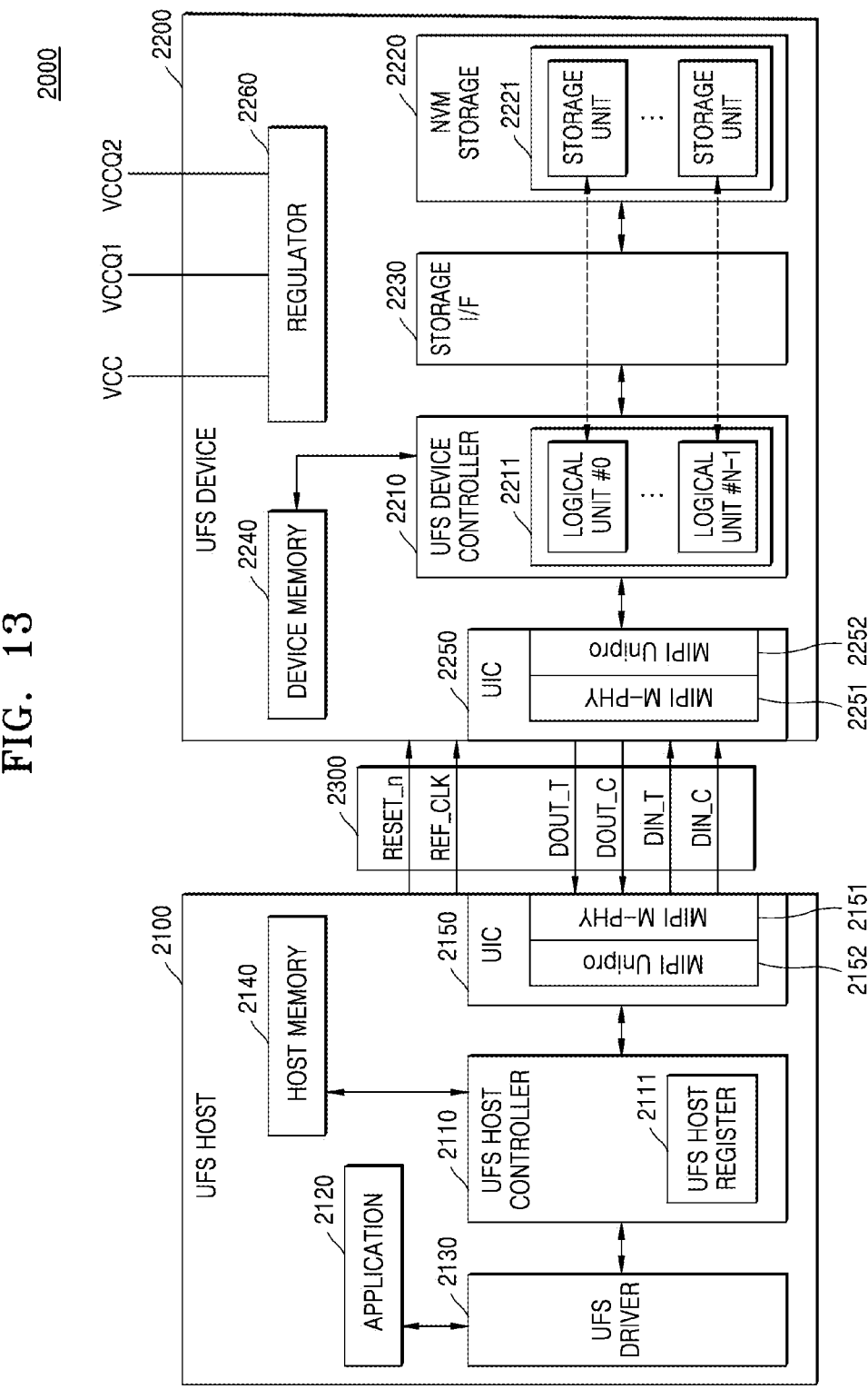
FIG. 13 is a diagram illustrating a Universal Flash Storage (UFS) system according to example embodiments of the inventive concepts.

FIG. 13 is a diagram illustrating a UFS system 2000 according to example embodiments of the inventive concepts. The UFS system 2000, which is a system conforming to the UFS standard announced by the Joint Electron Device Engineering Council (JEDEC), may include a UFS host 2100, a UFS device 2200, and a UFS interface 2300. The above descriptions of the system 1000 of FIG. 12 may also be applied to the UFS system 2000 of FIG. 13 unless conflicting with the following descriptions regarding FIG. 13.

Referring to FIG. 13, the UFS host 2100 and the UFS device 2200 may be connected to each other through the UFS interface 2300. When the main processor 1100 of FIG. 12 is an application processor, the UFS host 2100 may be implemented as a portion of a corresponding application processor. A UFS host controller 2110 and a host memory 2140 may respectively correspond to the controller 1120 and the memories 1200a and 1200b of the main processor 1100 of FIG. 12. The UFS device 2200 may correspond to the storage devices 1300a and 1300b of FIG. 12, and a UFS device controller 2210 and NVM storage 2220 may respectively correspond to the storage controllers 1310a and 1310b and the NVM storages 1320a and 1320b in FIG. 12.

The UFS host 2100 may include the UFS host controller 2110, an application 2120, a UFS driver 2130, the host memory 2140, and/or a UFS interconnect (UIC) layer 2150. The UFS device 2200 may include the UFS device controller 2210, the NVM storage 2220, a storage interface 2230, a device memory 2240, a UIC layer 2250, and/or a regulator 2260. The NVM storage 2220 may include a plurality of storage units 2221, and each storage unit 2221 may include V-NAND flash memory having a 2D structure or a 3D structure or may include another type of non-volatile memory such as PRAM and/or RRAM. The UFS device controller 2210 and the NVM storage 2220 may be connected to each other through the storage interface 2230. The storage interface 2230 may be implemented to conform to a standard specification such as Toggle or ONFI.

The application 2120 may refer to a program that intends to communicate with the UFS device 2200 to use a function of the UFS device 2200. The application 2120 may transmit an input-output request to the UFS driver 2130 to perform input to and output from the UFS device 2200. The input-output request may refer to, but is not limited to, a read request, a write request, and/or an discard request of data.

The UFS driver 2130 may manage the UFS host controller 2110 through a UFS-host controller interface (HCI). The UFS driver 2130 may convert the input-output request generated by the application 2120 into a UFS command defined by the UFS standard, and may transfer the converted UFS command to the UFS host controller 2110. One input-output request may be converted into a plurality of UFS commands. Although a UFS command may be basically a command defined by the SCSI standard, the UFS command may also be a UFS standard-dedicated command.

The UFS host controller 2110 may transmit the UFS command converted by the UFS driver 2130 to the UIC layer 2250 of the UFS device 2200 through the UIC layer 2150 and the UFS interface 2300. In this process, a UFS host register 2111 of the UFS host controller 2110 may perform a role as a command queue.

The UIC layer 2150 of the UFS host 2100 may include MIPI M-PHY 2151 and MIPI UniPro 2152, and the UIC layer 2250 of the UFS device 2200 may also include MIPI M-PHY 2251 and MIPI UniPro 2252.

The UFS interface 2300 may include a line for transmitting a reference clock signal REF_CLK, a line for transmitting a hardware reset signal RESET_n with respect to the UFS device 2200, a pair of lines for transmitting a differential input signal pair DIN_T and DIN_C, and a pair of lines for transmitting a differential output signal pair DOUT_T and DOUT_C.

A frequency value of the reference clock signal REF_CLK provided from the UFS host 2100 to the UFS device 2200 may be, but is not limited to, one of 19.2 MHz, 26 MHz, 338.4 MHz, and 52 MHz. Even while the UFS host 2100 is being operated, that is, even while data transmission and reception between the UFS host 2100 and the UFS device 2200 is being performed, the frequency value of the reference clock signal REF_CLK may be changed. The UFS device 2200 may generate clock signals having various frequencies from the reference clock signal REF_CLK received from the UFS host 2100, by using a phase-locked loop (PLL) or the like. In addition, the UFS host 2100 may also set a value of a data rate between the UFS host 2100 and the UFS device 2200, based on the frequency value of the reference clock signal REF_CLK. That is, the value of the data rate may be determined according to the frequency value of the reference clock signal REF_CLK.

The UFS interface 2300 may support a plurality of lanes, and each lane may be implemented by a differential pair. For example, a UFS interface may include one or more reception lanes and one or more transmission lanes. In FIG. 13, the pair of lines for transmitting the differential input signal pair DIN_T and DIN_C may constitute a reception lane, and the pair of lines for transmitting the differential output signal pair DOUT_T and DOUT_C may constitute a transmission lane. Although one transmission lane and one reception lane are illustrated in FIG. 13, the respective numbers of transmission lanes and reception lanes may be changed.

The reception lane and the transmission lane may transfer data in a serial communication manner, and full-duplex type communication between the UFS host 2100 and the UFS device 2200 may be allowed due to a structure in which the reception lane is separated from the transmission lane. That is, even while receiving data from the UFS host 2100 through the reception lane, the UFS device 2200 may transmit data to the UFS host 2100 through the transmission lane. In addition, control data such as a command from the UFS host 2100 to the UFS device 2200, and user data, which the UFS host 2100 intends to store in the NVM storage 2220 of the UFS device 2200 or to read from the NVM storage 2220, may be transferred through the same lane. Accordingly, there is no need to further arrange, between the UFS host 2100 and the UFS device 2200, a separate lane for data transfer, in addition to a pair of reception lanes and a pair of transmission lanes.

The UFS device controller 2210 of the UFS device 2200 may take overall control of operations of the UFS device 2200. The UFS device controller 2210 may manage the NVM storage 2220 through a logical unit (LU) 2211, which is a logical data storage unit. The number of LUs 2211 may be, but is not limited to, 8. The UFS device controller 2210 may include a flash translation layer (FTL) and, by using address mapping information of the FTL, may convert a logical data address, for example, a logical block address (LBA), which is transferred from the UFS host 2100, into a physical data address, for example, a physical block address (PBA). In the UFS system 2000, a logical block for storing user data may have a size in a certain range. For example, a minimum size of the logical block may be set to be 4 Kbyte.

When a command from the UFS host 2100 is input to the UFS device 2200 through the UIC layer 2250, the UFS device controller 2210 may perform an operation according to the input command, and when the operation is completed, the UFS device controller 2210 may transmit a completion response to the UFS host 2100.

For example, when the UFS host 2100 intends to store user data in the UFS device 2200, the UFS host 2100 may transmit a data storage command to the UFS device 2200. When a response indicative of being ready to receive the user data is received from the UFS device 2200, the UFS host 2100 may transmit the user data to the UFS device 2200. The UFS device controller 2210 may temporarily store the received user data in the device memory 2240 and, based on the address mapping information of the FTL, may store the user data temporarily stored in the device memory 2240 in a selected location of the NVM storage 2220.

As another example, when the UFS host 2100 intends to read the user data stored in the UFS device 2200, the UFS host 2100 may transmit a data read command to the UFS device 2200. The UFS device controller 2210 having received the data read command may read the user data from the NVM storage 2220, based on the data read command, and may temporarily store the read user data in the device memory 2240. In this data read process, the UFS device controller 2210 may detect and correct an error in the read user data, by using an embedded error correction code (ECC) circuit (not shown). In addition, the UFS device controller 2210 may transmit the user data temporarily stored in the device memory 2240 to the UFS host 2100. Further, the UFS device controller 2210 may further include an advanced encryption standard (AES) circuit (not shown), and the AES circuit may encrypt or decrypt data, which is input to the UFS device controller 2210, by using a symmetric-key algorithm.

The UFS host 2100 may store commands, which is to be transmitted to the UFS device 2200, in the UFS host register 2111 capable of functioning as a command queue according to an order, and may transmit the commands to the UFS device 2200 in the order. In some example embodiments, even when a previously transmitted command is still being processed by the UFS device 2200, that is, even before the UFS host 2100 receives a notification indicating that processing of the previously transmitted command is completed by the UFS device 2200, the UFS host 2100 may transmit the next command on standby in the command queue to the UFS device 2200, and thus, the UFS device 2200 may also receive the next command from the UFS host 2100 even while processing the previously transmitted command. The maximum number of commands capable of being stored in the command queue (that is, a queue depth) may be, for example, 332. In addition, the command queue may be implemented by a circular queue type in which a start and an end of a command sequence stored in a queue are respectively indicated by a head pointer and a tail pointer.

Each of the plurality of storage units 2221 may include a memory cell array and a control circuit for controlling an operation of the memory cell array. The memory cell array may include a 2D memory cell array or a 3D memory cell array. The memory cell array may include a plurality of memory cells, and each memory cell may be a single level cell (SLC) storing 1 bit of information or may be a cell storing 2 or more bits of information, such as a multi-level cell (MLC), a triple level cell (TLC), or a quadruple level cell (QLC). The 3D memory cell array may include a vertical NAND string vertically oriented such that at least one memory cell is located on another memory cell.

VCC, VCCQ1, VCCQ2, or the like may be input as a power supply voltage to the UFS device 2200. VCC, which is a main power supply voltage for the UFS device 2200, may have a value of 2.4 V to 3.6 V. VCCQ1, which is a power supply voltage for supplying a voltage in a low-voltage range, is mainly for the UFS device controller 2210 and may have a value of 1.14 V to 1.26 V. VCCQ2, which is a power supply voltage for supplying a voltage in a range higher than VCCQ1 and lower than VCC, is mainly for an input-output interface such as the MIPI M-PHY 2251 and may have a value of 1.7 V to 1.95 V. The power supply voltages set forth above may be supplied for the respective components of the UFS device 2200 through the regulator 2260. The regulator 2260 may be implemented by a set of unit regulators respectively connected to different ones of the power supply voltages set forth above.

Figure 14A:
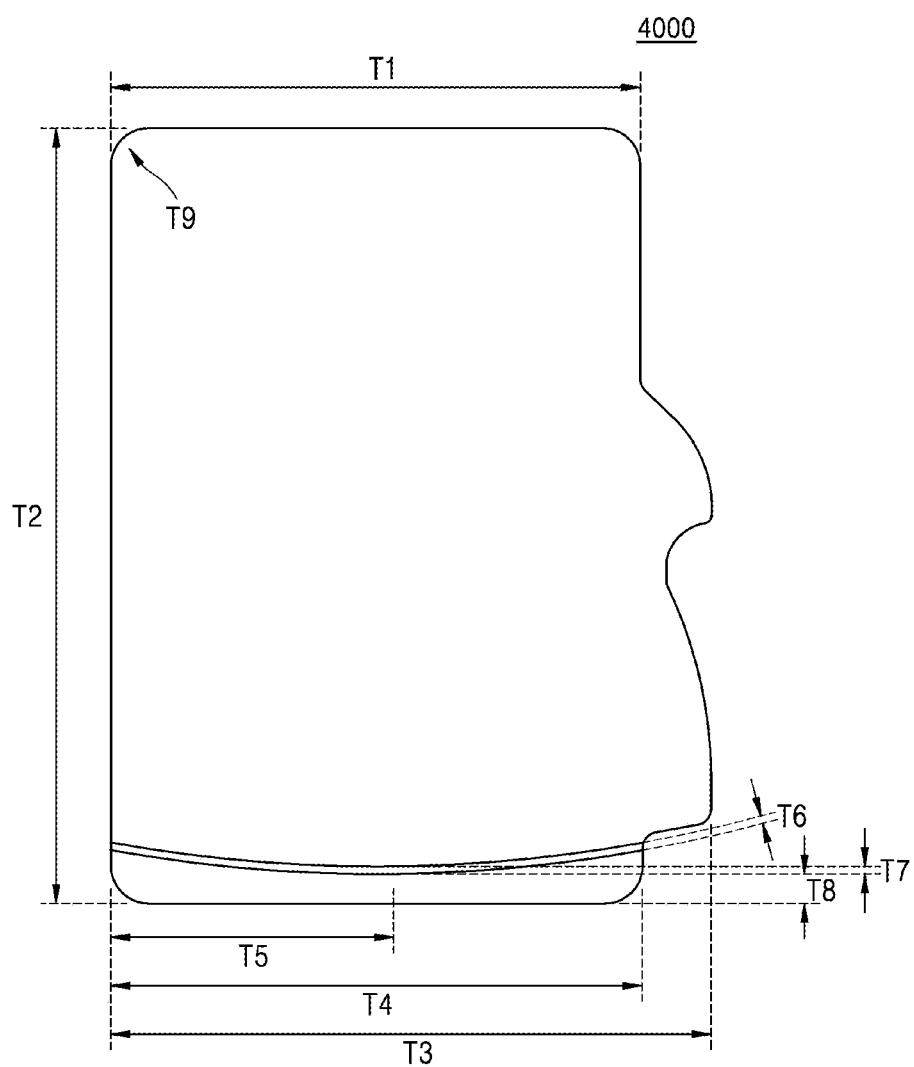
FIGS. 14A to 14C are diagrams illustrating a form factor of a UFS card.
Figure 14B:
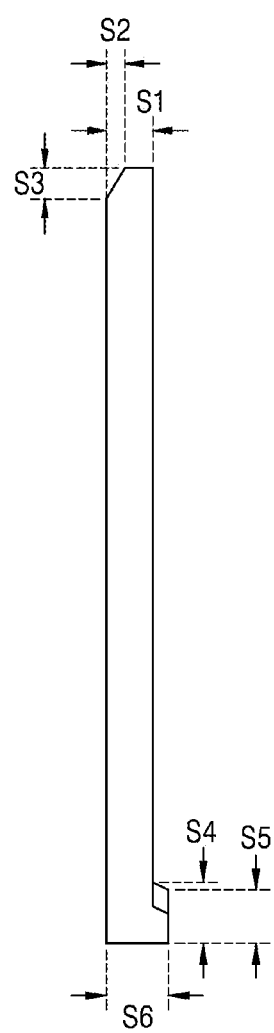
Figure 14C:
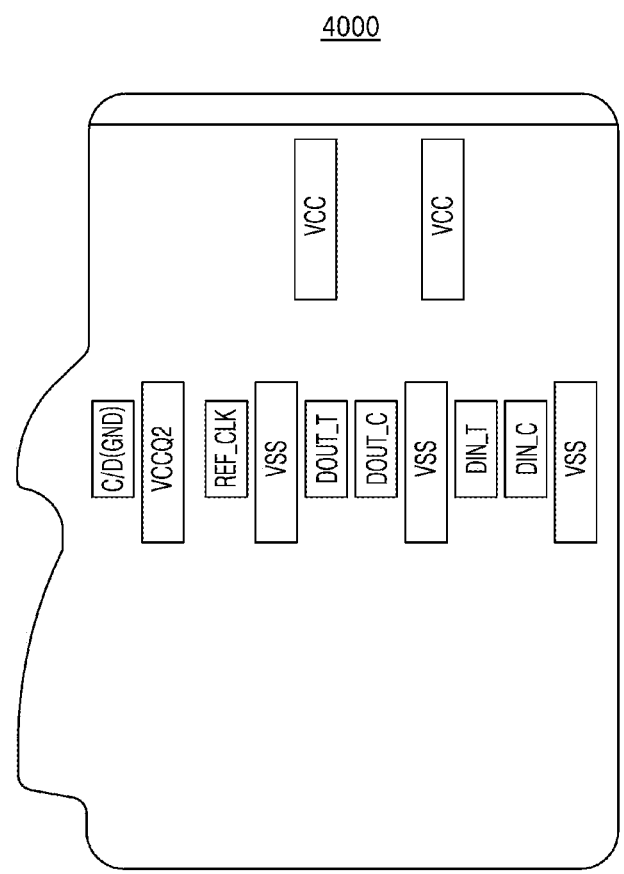

FIGS. 14A to 14C are diagrams illustrating a form factor of a UFS card. When the UFS device 2200 described with reference to FIG. 13 is implemented in the form of a UFS card 4000, an appearance of the UFS card 4000 may be as illustrated in FIGS. 14A to 14C.

FIG. 14A illustrates an example of a top view of the UFS card 4000. Referring to FIG. 14A, it can be confirmed that the UFS card 4000 follows a shark-shaped design on the whole. Regarding FIG. 14A, the UFS card 4000 may have, for example, dimension values listed in the following Table 1.

TABLE 1

| Item | Dimension (mm) |
| --- | --- |
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | R0.80 |

FIG. 14B illustrates an example of a side view of the UFS card 4000. Regarding FIG. 14B, the UFS card 4000 may have, for example, dimension values listed in the following Table 2.

TABLE 2

| Item | Dimension (mm) |
| --- | --- |
| S1 | 0.74 + 0.06 |
| S2 | 0.30 |
| S3 | 0.52 |

TABLE 2-continued

| Item | Dimension (mm) |
|---|---|
| S4 | 1.20 |
| S5 | 1.05 |
| S6 | 1.00 |

FIG. 14C shows an example of a bottom view of the UFS card 4000. Referring to FIG. 14C, a plurality of pins for electrical contact with a UFS slot may be formed on a bottom surface of the UFS card 4000, and a function of each pin will be described below. In accordance with the symmetry between the top surface and the bottom surface of the UFS card 4000, some (for example, T1 to T5 and T9) of the dimensions described with reference to FIG. 14A and Table 1 may also be applied to the bottom view of the UFS card 4000 shown in FIG. 14C.

A plurality of pins for electrical connection to a UFS host may be formed on the bottom surface of the UFS card 4000, and according to FIG. 14C, the number of pins may be 12 in total. Each pin may have a rectangular shape, and a signal name corresponding to a pin is as marked in FIG. 14C. General information about each pin may refer to the following Table 3, and a reference may also be made to the descriptions given above regarding FIG. 13.

TABLE 3

| Number | Signal Name | Description | Dimension (mm) |
|---|---|---|---|
| 1 | VSS | Ground (GND) | 3.00 × 0.72 ± 0.05 |
| 2 | DIN_C | Differential input signal input from a host to the UFS card 4000 (where DIN_C denotes a negative node, and DIN_T denotes a positive node) | 1.50 × 0.72 ± 0.05 |
| 3 | DIN_T | | |
| 4 | VSS | Same as in Number 1 | 3.00 × 0.72 ± 0.05 |
| 5 | DOUT_C | Differential output signal output from the UFS card 4000 to a host (where DOUT_C denotes a negative node, and DOUT_T denotes a positive node) | 1.50 × 0.72 ± 0.05 |
| 6 | DOUT_T | | |
| 7 | VSS | Same as in Number 1 | 3.00 × 0.72 ± 0.05 |
| 8 | REF_CLK | Reference clock signal provided from a host to the UFS card 4000 | 1.50 × 0.72 ± 0.05 |
| 9 | VCCQ2 | Power supply voltage, which is provided mainly for a PHY interface or controller, and which has a relatively lower value than Vcc | 3.00 × 0.72 ± 0.05 |
| 10 | C/D (GND) | Signal for card detection | 1.50 × 0.72 ± 0.05 |
| 11 | VSS | Same as in Number 1 | 3.00 × 0.80 ± 0.05 |
| 12 | Vcc | Main power supply voltage | |

Figure 15:
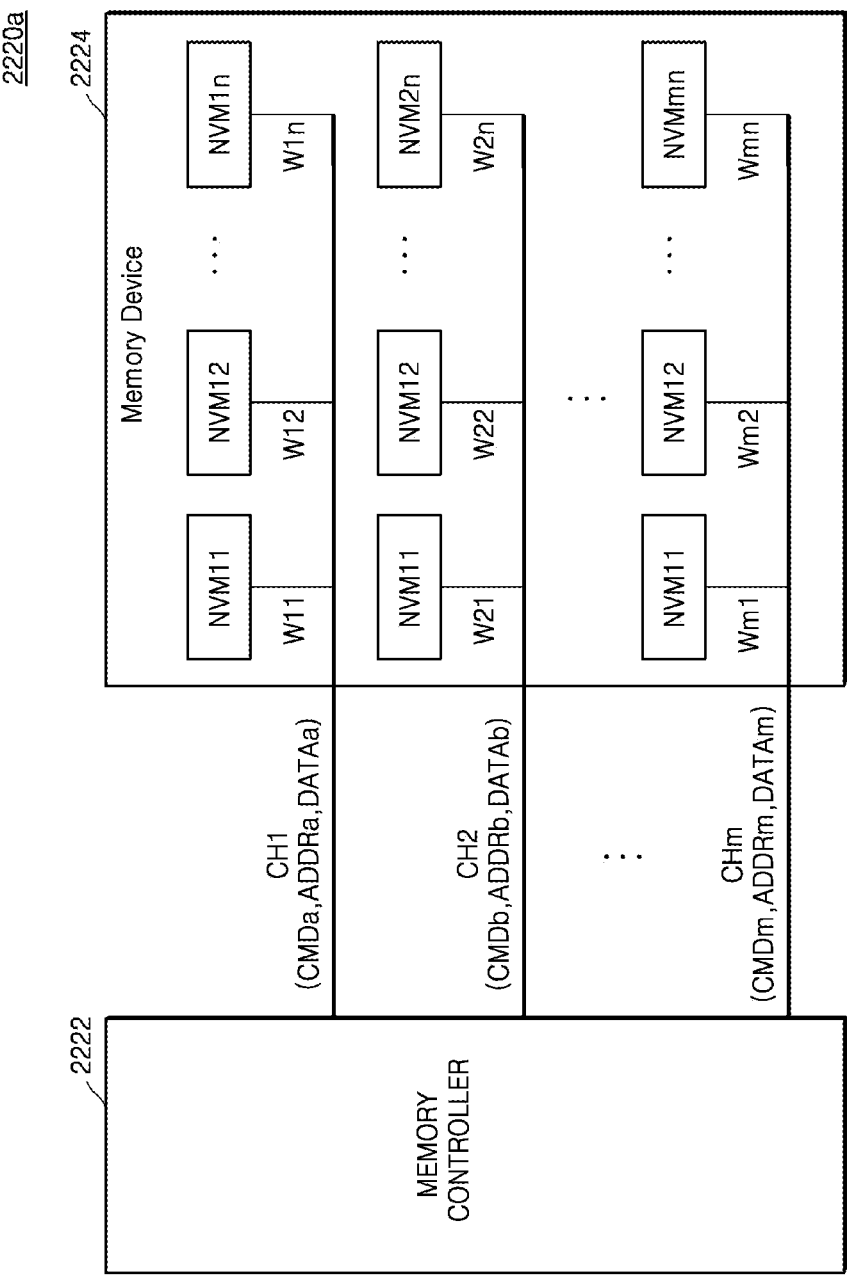
FIG. 15 is a block diagram illustrating a non-volatile memory (NVM) storage according to example embodiments of the inventive concepts.

FIG. 15 is a block diagram illustrating NVM storage according to example embodiments of the inventive concepts.

Referring to FIG. 15, NVM storage 2220a may include a memory device 2224 and a memory controller 2222. The NVM storage 2220a may support a plurality of channels CH1 to CHm, and the memory device 2224 may be connected to the memory controller 2222 through the plurality of channels CH1 to CHm. For example, the NVM storage 2220a may be implemented by a storage device such as a solid state drive (SSD).

The memory device 2224 may include a plurality of non-volatile memory devices NVM11 to NVMmn. Each of the non-volatile memory devices NVM11 to NVMmn may be connected to one of the plurality of channels CH1 to CHm through a corresponding way. For example, the non-volatile memory devices NVM11 to NVM1n may be respectively connected to a first channel CH1 through ways W11 to W1n, and the non-volatile memory devices NVM21 to NVM2n may be respectively connected to a second channel CH2 through ways W21 to W2n. In example embodiments, each of the non-volatile memory devices NVM11 to NVMmn may be implemented by any memory unit capable of operating according to an individual command from the memory controller 2222. For example, although each of the non-volatile memory devices NVM11 to NVMmn may be implemented by a chip or a die, the inventive concepts are not limited thereto.

The memory controller 2222 may transmit signals to and receive signals from the memory device 2224 through the plurality of channels CH1 to CHm. For example, the memory controller 2222 may transmit commands CMDa to CMDm, addresses ADDRa to ADDRm, and data DATAa to DATAm to the memory device 2224 through the channels CH1 to CHm or may receive the data DATAa to DATAm from the memory device 2224.

The memory controller 2222 may select, through each channel, one of the non-volatile memory devices connected to the corresponding channel and may transmit signals to and receive signals from the selected non-volatile memory device. For example, the memory controller 2222 may select a non-volatile memory device NVM11 from among the non-volatile memory devices NVM11 to NVM1n connected to the first channel CH1. The memory controller 2222 may transmit the command CMDa, the address ADDRa, and the data DATAa to the selected non-volatile memory device NVM11 or may receive the data DATAa from the selected non-volatile memory device NVM11, through the first channel CH1.

The memory controller 2222 may transmit signals to and receive signals from the memory device 2224 in parallel through different channels. For example, the memory controller 2222 may transmit the command CMDb to the memory device 2224 through the second channel CH2 while transmitting the command CMDa to the memory device 2224 through the first channel CH1. For example, the memory controller 2222 may receive the data DATAb from the memory device 2224 through the second channel CH2 while receiving the data DATAa from the memory device 2224 through the first channel CH1.

The memory controller 2222 may control overall operations of the memory device 2224. The memory controller 2222 may control each of the non-volatile memory devices NVM11 to NVMmn connected to the channels CH1 to CHm by transmitting signals to the channels CH1 to CHm. For example, the memory controller 2222 may control one selected from among the non-volatile memory devices NVM11 to NVM1n by transmitting the command CMDa and the address ADDRa to the first channel CH1.

Each of the non-volatile memory devices NVM11 to NVMmn may be operated according to control by the memory controller 2222. For example, the non-volatile memory device NVM11 may program the data DATAa according to the command CMDa, the address ADDRa, and the data DATAa, which are provided to the first channel CH1. For example, the non-volatile memory device NVM21 may read the data DATAb according to the command CMDb and the address ADDRb, which are provided to the second channel CH2, and may transmit the read data DATAb to the memory controller 2222.

Although FIG. 15 illustrates that the memory device 2224 communicates with the memory controller 2222 through m channels and includes n non-volatile memory devices in correspondence with each channel, the number of channels and the number of non-volatile memory devices connected to one channel may be variously changed.

Figure 16:
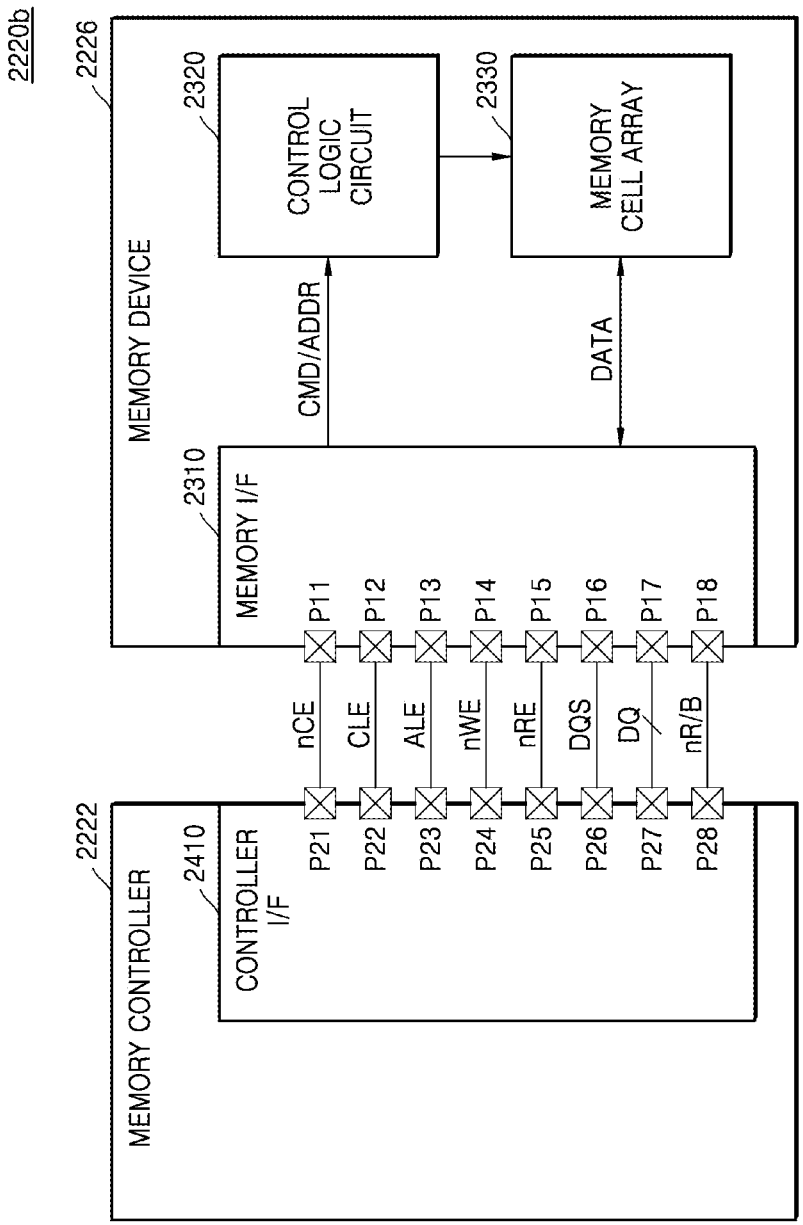
FIG. 16 is a block diagram illustrating an NVM storage according to example embodiments of the inventive concepts.

FIG. 16 is a block diagram illustrating an NVM storage according to example embodiments of the inventive concepts. Referring to FIG. 16, an NVM storage 2220b may include a memory device 2226 and the memory controller 2222. The memory device 2226 may correspond to one of the non-volatile memory devices NVM11 to NVMmn communicating with the memory controller 2222 based on one of the plurality of channels CH1 to CHm of FIG. 15. The memory controller 2222 may correspond to the memory controller 2222 of FIG. 15.

The memory device 2226 may include first to eighth pins P11 to P18, a memory interface circuit 2310, a control logic circuit 2320, and/or a memory cell array 2330.

The memory interface circuit 2310 may receive a chip enable signal nCE from the memory controller 2222 through the first pin P11. The memory interface circuit 2310 may transmit signals to and receive signals from the memory controller 2222 through the second to eighth pins P12 to P18 according to the chip enable signal nCE. For example, when the chip enable signal nCE is in an enabled state (for example, a low level), the memory interface circuit 2310 may transmit signals to and receive signals from the memory controller 2222 through the second to eighth pins P12 to P18.

The memory interface circuit 2310 may receive a command latch enable signal CLE, an address latch enable signal ALE, and a write enable signal nWE from the memory controller 2222 through the second to fourth pins P12 to P14. The memory interface circuit 2310 may receive a data signal DQ from the memory controller 2222 or may transmit the data signal DQ to the memory controller 2222, through the seventh pin P17. A command CMD, an address ADDR, and data may be transferred through the data signal DQ. For example, the data signal DQ may be transferred through a plurality of data signal lines. In some example embodiments, the seventh pin P17 may include a plurality of pins corresponding to a plurality of data signals.

The memory interface circuit 2310 may obtain the command CMD from the data signal DQ received in an enabled period (for example, a high-level state) of the command latch enable signal CLE, based on toggle timings of the write enable signal nWE. The memory interface circuit 2310 may obtain the address ADDR from the data signal DQ received in an enabled period (for example, a high-level state) of the address latch enable signal ALE, based on the toggle timings of the write enable signal nWE.

In example embodiments, the write enable signal nWE may be maintained in a static state (for example, a high level or a low level) and then may toggle between the high level and the low level. For example, the write enable signal nWE may toggle in a period in which the command CMD or the address ADDR is transmitted. Accordingly, the memory interface circuit 2310 may obtain the command CMD or the address ADDR, based on the toggle timings of the write enable signal nWE.

The memory interface circuit 2310 may receive a read enable signal nRE from the memory controller 2222 through the fifth pin P15. The memory interface circuit 2310 may receive a data strobe signal DQS from the memory controller 2222 or transmit the data strobe signal DQS to the memory controller 2222, through the sixth pin P16.

In a data output operation of the memory device 2226, the memory interface circuit 2310 may receive the read enable signal nRE that toggles, through the fifth pin P15, before the data DATA is output. The memory interface circuit 2310 may generate the data strobe signal DQS that toggles, based on the toggling of the read enable signal nRE. For example, the memory interface circuit 2310 may generate the data strobe signal DQS starting to toggle after a preset delay (for example, tDQSRE) from a toggling start time of the read enable signal nRE. The memory interface circuit 2310 may transmit the data signal DQ including the data DATA, based on a toggle timing of the data strobe signal DQS. Accordingly, the data DATA may be transmitted to the memory controller 2222 in alignment with the toggle timing of the data strobe signal DQS.

In a data input operation of the memory device 2226, when the data signal DQ including the data DATA is received from the memory controller 2222, the memory interface circuit 2310 may receive the data strobe signal DQS that toggles, together with the data DATA, from the memory controller 2222. The memory interface circuit 2310 may obtain the data DATA from the data signal DQ, based on the toggle timing of the data strobe signal DQS. For example, the memory interface circuit 2310 may obtain the data DATA by sampling the data signal DQ at a rising edge and a falling edge of the data strobe signal DQS.

The memory interface circuit 2310 may transmit a ready/busy output signal nR/B through the eighth pin P18. The memory interface circuit 2310 may transmit state information of the memory device 2226 to the memory controller 2222 through the ready/busy output signal nR/B. When the memory device 2226 is in a busy state (that is, when internal operations of the memory device 2226 are being performed), the memory interface circuit 2310 may transmit, to the memory controller 2222, the ready/busy output signal nR/B indicating the busy state. When the memory device 2226 is in a ready state (that is, when the internal operations of the memory device 2226 are not being performed or are completed), the memory interface circuit 2310 may transmit, to the memory controller 2222, the ready/busy output signal nR/B indicating the ready state. For example, while the memory device 2226 reads the data DATA from the memory cell array 2330 in response to a page read command, the memory interface circuit 2310 may transmit, to the memory controller 2222, the ready/busy output signal nR/B indicating the busy state (for example, a low level). For example, while the memory device 2226 programs the data DATA into the memory cell array 2330 in response to a program command, the memory interface circuit 2310 may transmit, to the memory controller 2222, the ready/busy output signal nR/B indicating the busy state (for example, a low level).

The control logic circuit 2320 may take overall control of various operations of the memory device 2226. The control logic circuit 2320 may receive a command/address CMD/ADDR obtained from the memory interface circuit 2310. The control logic circuit 2320 may generate control signals for controlling the other components of the memory device 2226, according to the received command/address CMD/ADDR. For example, the control logic circuit 2320 may generate various control signals for programming the data DATA into the memory cell array 2330 or reading the data DATA from the memory cell array 2330.

The memory cell array 2330 may store the data DATA obtained from the memory interface circuit 2310, according to control by the control logic circuit 2320. The memory cell array 2330 may output the stored data DATA to the control logic circuit 2320, according to control by the control logic circuit 2320.

The memory cell array 2330 may include a plurality of memory cells. For example, the plurality of memory cells may include flash memory cells. However, the inventive concepts are not limited thereto, and the memory cells may include RRAM cells, ferroelectric RAM (FRAM) cells, PRAM cells, thyristor RAM (TRAM) cells, or MRAM cells. Hereinafter, example embodiments of the inventive concepts, in which the memory cells are NAND flash memory cells, will be mainly described.

The memory controller 2222 may include first to eighth pins P21 to P28 and a controller interface circuit 2410. The first to eighth pins P21 to P28 may correspond to the first to eighth pins P11 to P18 of the memory device 2226.

The controller interface circuit 2410 may transmit the chip enable signal nCE to the memory device 2226 through the first pin P21. The controller interface circuit 2410 may transmit signals to and receive signals from the memory device 2226, which is selected through the chip enable signal nCE, through the second to eighth pins P22 to P28.

The controller interface circuit 2410 may transmit the command enable signal CLE, the address latch enable signal ALE, and the write enable signal nWE to the memory device 2226 through the second to fourth pins P22 to P24. The controller interface circuit 2410 may transmit the data signal DQ to the memory device 2226 or receive the data signal DQ from the memory device 2226, through the seventh pin P27.

The controller interface circuit 2410 may transmit the data signal DQ including the command CMD or the address ADDR, together with the write enable signal nWE that is toggling, to the memory device 2226. The controller interface circuit 2410 may transmit the data signal DQ including the command CMD according to transmitting the command latch enable signal CLE having an enabled state, and the controller interface circuit 2410 may transmit the data signal DQ including the address ADDR according to transmitting the address latch enable signal ALE having an enabled state.

The controller interface circuit 2410 may transmit the read enable signal nRE to the memory device 2226 through the fifth pin P25. The controller interface circuit 2410 may receive the data strobe signal DQS from the memory device 2226 or transmit the data strobe signal DQS to the memory device 2226, through the sixth pin P26.

In a data output operation of the memory device 2226, the controller interface circuit 2410 may generate the read enable signal nRE that toggles, and may transmit the read enable signal nRE to the memory device 2226. For example, the controller interface circuit 2410 may generate the read enable signal nRE, which changes from a static state (for example, a high level or a low level) to a toggle state, before the data DATA is output. Accordingly, in the memory device 2226, the data strobe signal DQS toggling based on the read enable signal nRE may be generated. The controller interface circuit 2410 may receive the data signal DQ including the data DATA, together with the data strobe signal DQS that toggles, from the memory device 2226. The controller interface circuit 2410 may obtain the data DATA from the data signal DQ, based on the toggle timing of the data strobe signal DQS.

In a data input operation of the memory device 2226, the controller interface circuit 2410 may generate the data strobe signal DQS that toggles. For example, the controller interface circuit 2410 may generate the data strobe signal DQS, which changes from a static state (for example, a high level or a low level) to a toggle state, before the data DATA is transmitted. The controller interface circuit 2410 may transmit the data signal DQ including the data DATA to the memory device 2226, based on toggle timings of the data strobe signal DQS.

The controller interface circuit 2410 may receive the ready/busy output signal nR/B from the memory device 2226 through the eighth pin P28. The controller interface circuit 2410 may determine the state information of the memory device 2226, based on the ready/busy output signal nR/B.

Figure 17:
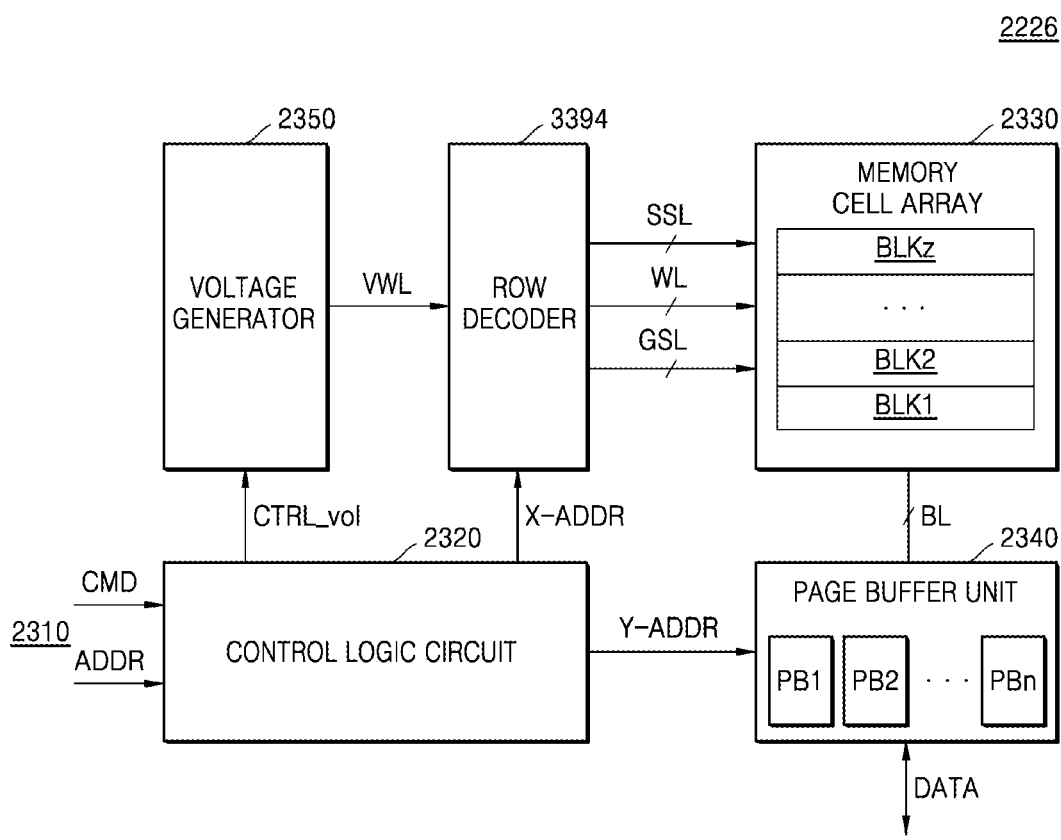
FIG. 17 is an example block diagram illustrating a memory device of FIG. 16.

FIG. 17 is an example block diagram illustrating the memory device of FIG. 16. Referring to FIG. 17, the memory device 2226 may include the control logic circuit 2320, the memory cell array 2330, a page buffer unit 2340, a voltage generator 2350, and/or a row decoder 3394. Although not shown in FIG. 17, the memory device 2226 may further include the memory interface circuit 2310 shown in FIG. 16 and may further include column logic, a pre-decoder, a temperature sensor, a command decoder, an address decoder, or the like.

The control logic circuit 2320 may take overall control of various operations in the memory device 2226. The control logic circuit 2320 may output various control signals in response to the command CMD and/or the address ADDR from the memory interface circuit 2310. For example, the control logic circuit 2320 may output a voltage control signal CTRL_vol, a row address X-ADDR, and a column address Y-ADDR.

The memory cell array 2330 may include a plurality of memory cell blocks BLK1 to BLKz (where z is a positive integer), and each of the plurality of memory cell blocks BLK1 to BLKz may include a plurality of memory cells. The memory cell array 2330 may be connected to the page buffer unit 2340 through bit lines BL and may be connected to the row decoder 3394 through word lines WL, string select lines SSL, and ground select lines GSL.

In example embodiments, the memory cell array 2330 may include a 3D memory cell array, and the 3D memory cell array may include a plurality of NAND strings. Each NAND string may include the memory cells respectively connected to word lines that are vertically stacked on a substrate. U.S. Pat. Nos. 7,679,133, 8,553,466, 8,654,587, 8,559,235, and U.S. Application Publication No. 2011/0233648 are incorporated herein by reference. In example embodiments, the memory cell array 2330 may include a 2D memory cell array, and the 2D memory cell array may include a plurality of NAND strings arranged in row and column directions.

The page buffer unit 2340 may include a plurality of page buffers PB1 to PBn (where n is an integer equal to or greater than 3), and the plurality of page buffers PB1 to PBn may be respectively connected to the memory cells through a plurality of bit lines BL. The page buffer unit 2340 may select at least one of the bit lines BL in response to the column address Y-ADDR. The page buffer unit 2340 may operate as a write driver or a sense amplifier according to an operation mode. For example, during a program operation, the page buffer unit 2340 may apply a bit line voltage, which corresponds to data to be programmed, to a selected bit line. During a read operation, the page buffer unit 2340 may sense data stored in a memory cell by sensing a current or a voltage of the selected bit line.

The voltage generator 2350 may generate various voltages for performing program, read, and erase operations, based on the voltage control signal CTRL_vol. For example, the voltage generator 2350 may generate, as a word line voltage VWL, a program voltage, a read voltage, a program verification voltage, an erase voltage, or the like.

In response to the row address X-ADDR, the row decoder 3394 may select one of a plurality of word lines WL and may select one of a plurality of string select lines SSL. For example, during the program operation, the row decoder 3394 may apply the program voltage and the program verification voltage to the selected word line, and during the read operation, the row decoder 3394 may apply the read voltage to the selected word line.

Figure 18:
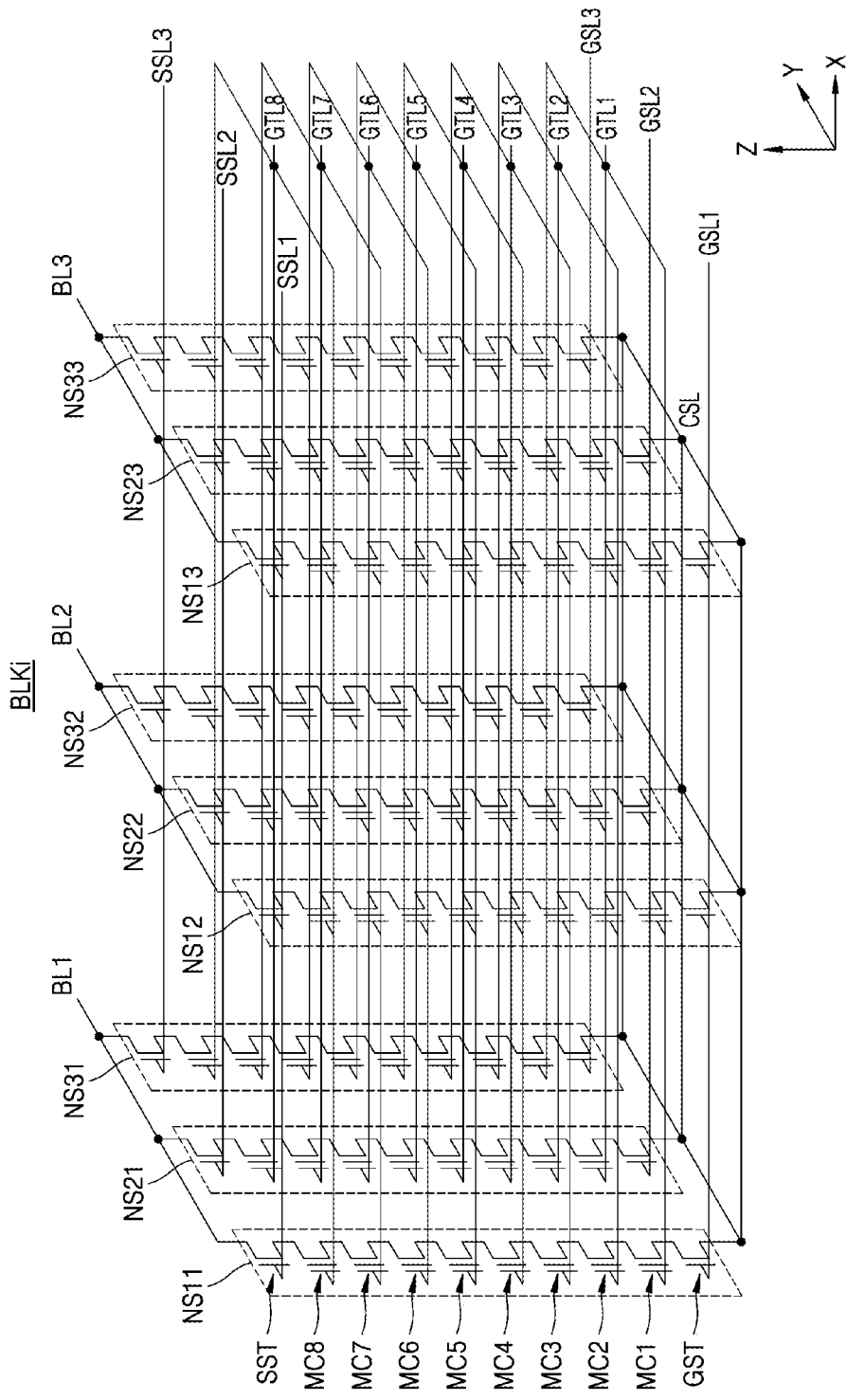
FIG. 18 is a diagram illustrating a 3D V-NAND structure capable of being applied to a UFS device according to example embodiments of the inventive concepts.

FIG. 18 is a diagram illustrating a 3D V-NAND structure capable of being applied to a UFS device according to example embodiments of the inventive concepts. When a storage module of the UFS device is implemented by 3D V-NAND type flash memory, a plurality of memory blocks constituting the storage module may each be represented by an equivalent circuit shown in FIG. 18.

A memory block BLKi shown in FIG. 18 represents a 3D memory block formed in a 3D structure on a substrate. For example, a plurality of memory NAND strings included in the memory block BLKi may be formed in a direction vertical to the substrate.

Referring to FIG. 18, the memory block BLKi may include a plurality of memory NAND strings NS11 to NS33 connected between bit lines BL1, BL2, and BL3 and a common source line CSL. Each of the plurality of memory NAND strings NS11 to NS33 may include a string select transistor SST, a plurality of memory cells MC1 to MC8, and a ground select transistor GST. Although FIG. 18 illustrates that each of the plurality of memory NAND strings NS11 to NS33 includes 8 memory cells MC1 to MC8, the inventive concepts are not limited thereto.

The string select transistor SST may be connected to a corresponding string select line SSL1, SSL2, or SSL3. The plurality of memory cells MC1 to MC8 may be respectively connected to corresponding gate lines GTL1 to GTL8. The gate lines GTL1 to GTL8 may correspond to word lines, and some of the gate lines GTL1 to GTL8 may correspond to dummy word lines. The ground select transistor GST may be connected to a corresponding ground select line GSL1, GSL2, or GSL3. The string select transistor SST may be connected to the corresponding bit line BL1, BL2, or BL3, and the ground select transistor GST may be connected to the common source line CSL.

The word lines (for example, WL1) at the same height may be commonly connected to each other, the ground select lines GSL1, GSL2, and GSL3 may be separated from each other, and the string select lines SSL1, SSL2, and SSL3 may be separated from each other. Although FIG. 18 illustrates that the memory block BLKi is connected to the eight gate lines GTL1 to GTL8 and the three bit lines BL1, BL2, and BL3, the inventive concepts are not limited thereto.

Figure 19:
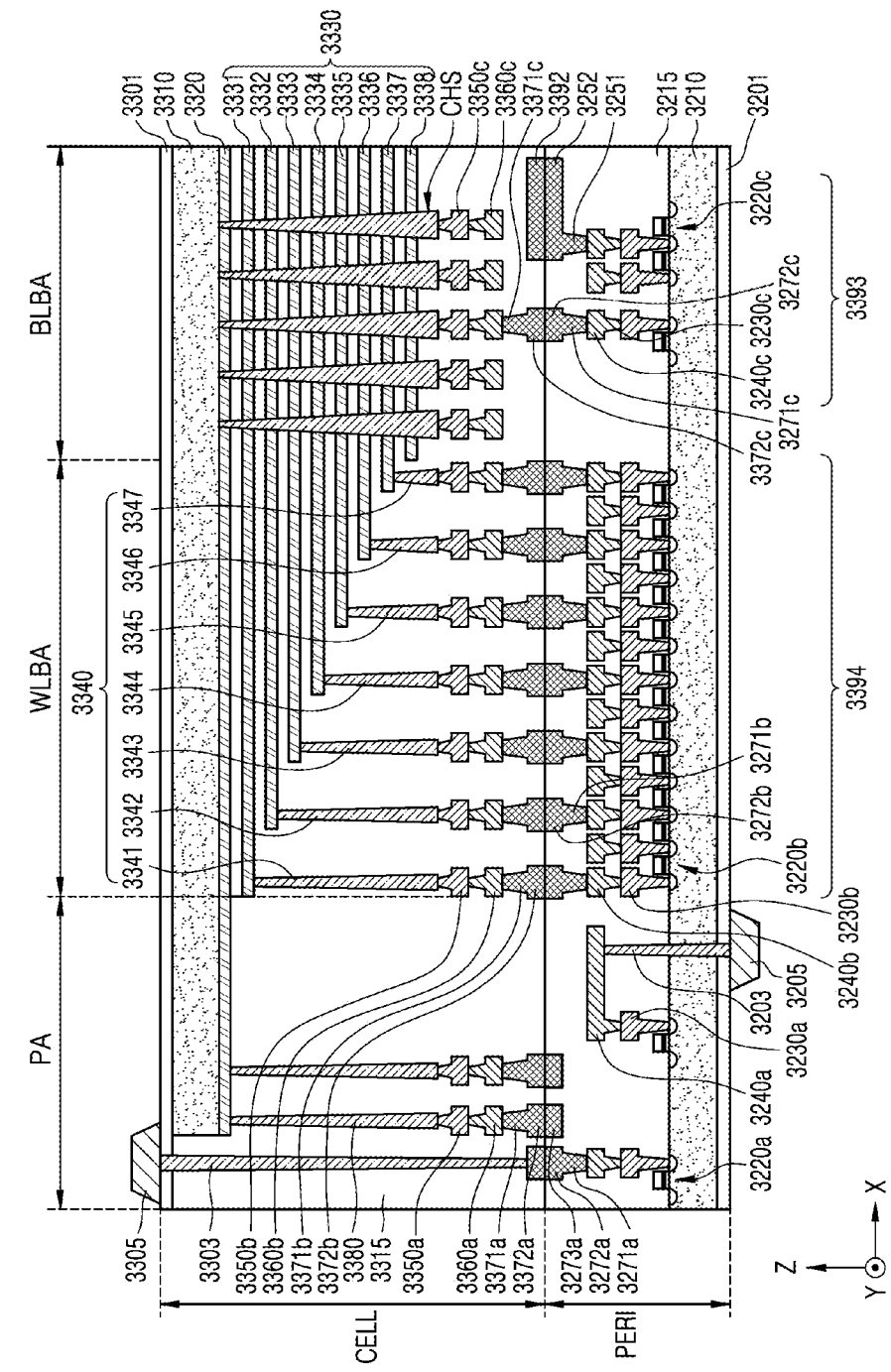
FIG. 19 is a diagram illustrating a BVNAND structure capable of being applied to a UFS device according to example embodiments of the inventive concepts.

FIG. 19 is a diagram illustrating a BVNAND structure capable of being applied to a UFS device according to example embodiments of the inventive concepts.

Referring to FIG. 19, a memory device 2226 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. Example embodiments, however, may not be limited thereto. For example, the bonding metals may also be formed of aluminum (Al) or tungsten (W).

Each of the peripheral circuit region PERI and the cell region CELL of the memory device 2226 may include an external pad bonding area PA, a word line bonding area WLBA, and a bit line bonding area BLBA.

The peripheral circuit region PERI may include a first substrate 3210, an interlayer insulating layer 3215, a plurality of circuit elements 3220*a*, 3220*b*, and 3220*c* formed on the first substrate 3210, first metal layers 3230*a*, 3230*b*, and 3230*c* respectively connected to the plurality of circuit elements 3220*a*, 3220*b*, and 3220*c*, and second metal layers 3240*a*, 3240*b*, and 3240*c* formed on the first metal layers 3230*a*, 3230*b*, and 3230*c*. In example embodiments, the first metal layers 3230*a*, 3230*b*, and 3230*c* may be formed of tungsten having relatively high electrical resistivity, and the second metal layers 3240*a*, 3240*b*, and 3240*c* may be formed of copper having relatively low electrical resistivity.

In example embodiments illustrated in FIG. 19, although only the first metal layers 3230*a*, 3230*b*, and 3230*c* and the second metal layers 3240*a*, 3240*b*, and 3240*c* are shown and described, example embodiments is not limited thereto, and one or more additional metal layers may be further formed on the second metal layers 3240*a*, 3240*b*, and 3240*c*. At least a portion of the one or more additional metal layers formed on the second metal layers 3240*a*, 3240*b*, and 3240*c* may be formed of aluminum or the like having a lower electrical resistivity than those of copper forming the second metal layers 3240*a*, 3240*b*, and 3240*c*.

The interlayer insulating layer 3215 may be disposed on the first substrate 3210 and cover the plurality of circuit elements 3220*a*, 3220*b*, and 3220*c*, the first metal layers 3230*a*, 3230*b*, and 3230*c*, and the second metal layers 3240*a*, 3240*b*, and 3240*c*. The interlayer insulating layer 3215 may include an insulating material such as silicon oxide, silicon nitride, or the like.

Lower bonding metals 3271*b* and 3272*b* may be formed on the second metal layer 3240*b* in the word line bonding area WLBA. In the word line bonding area WLBA, the lower bonding metals 3271*b* and 3272*b* in the peripheral circuit region PERI may be electrically bonded to upper bonding metals 3371*b* and 3372*b* of the cell region CELL. The lower bonding metals 3271*b* and 3272*b* and the upper bonding metals 3371*b* and 3372*b* may be formed of aluminum, copper, tungsten, or the like. Further, the upper bonding metals 3371*b* and 3372*b* in the cell region CELL may be referred as first metal pads and the lower bonding metals 3271*b* and 3272*b* in the peripheral circuit region PERI may be referred as second metal pads.

The cell region CELL may include at least one memory block. The cell region CELL may include a second substrate 3310 and a common source line 3320. On the second substrate 3310, a plurality of word lines 3331 to 3338 (e.g., 3330) may be stacked in a direction (a Z-axis direction), perpendicular to an upper surface of the second substrate 3310. At least one string select line and at least one ground select line may be arranged on and below the plurality of word lines 3330, respectively, and the plurality of word lines 3330 may be disposed between the at least one string select line and the at least one ground select line.

In the bit line bonding area BLBA, a channel structure CH may extend in a direction (a Z-axis direction), perpendicular to the upper surface of the second substrate 3310, and pass through the plurality of word lines 3330, the at least one string select line, and the at least one ground select line. The channel structure CH may include a data storage layer, a channel layer, a buried insulating layer, and/or the like, and the channel layer may be electrically connected to a first metal layer 3350c and a second metal layer 3360c. For example, the first metal layer 3350c may be a bit line contact, and the second metal layer 3360c may be a bit line. In example embodiments, the bit line 3360c may extend in a first direction (a Y-axis direction), parallel to the upper surface of the second substrate 3310.

In example embodiments illustrated in FIG. 19, an area in which the channel structure CH, the bit line 3360c, and/or the like are disposed may be defined as the bit line bonding area BLBA. In the bit line bonding area BLBA, the bit line 3360c may be electrically connected to the circuit elements 3220c providing a page buffer 3393 in the peripheral circuit region PERI. The bit line 3360c may be connected to upper bonding metals 3371c and 3372c in the cell region CELL, and the upper bonding metals 3371c and 3372c may be connected to lower bonding metals 3271c and 3272c connected to the circuit elements 3220c of the page buffer 3393.

In the word line bonding area WLBA, the plurality of word lines 3330 may extend in a second direction (an X-axis direction), parallel to the upper surface of the second substrate 3310 and perpendicular to the first direction, and may be connected to a plurality of cell contact plugs 3341 to 3347 (e.g., 3340). The plurality of word lines 3330 and the plurality of cell contact plugs 3340 may be connected to each other in pads provided by at least a portion of the plurality of word lines 3330 extending in different lengths in the second direction. A first metal layer 3350b and a second metal layer 3360b may be connected to an upper portion of the plurality of cell contact plugs 3340 connected to the plurality of word lines 3330, sequentially. The plurality of cell contact plugs 3340 may be connected to the peripheral circuit region PERI by the upper bonding metals 3371b and 3372b of the cell region CELL and the lower bonding metals 3271b and 3272b of the peripheral circuit region PERI in the word line bonding area WLBA.

The plurality of cell contact plugs 3340 may be electrically connected to the circuit elements 3220b forming a row decoder 3394 in the peripheral circuit region PERI. In example embodiments, operating voltages of the circuit elements 3220b of the row decoder 3394 may be different than operating voltages of the circuit elements 3220c forming the page buffer 3393. For example, operating voltages of the circuit elements 3220c forming the page buffer 3393 may be greater than operating voltages of the circuit elements 3220b forming the row decoder 3394.

A common source line contact plug 3380 may be disposed in the external pad bonding area PA. The common source line contact plug 3380 may be formed of a conductive material such as a metal, a metal compound, polysilicon, or the like, and may be electrically connected to the common source line 3320. A first metal layer 3350a and a second metal layer 3360a may be stacked on an upper portion of the common source line contact plug 3380, sequentially. For example, an area in which the common source line contact plug 3380, the first metal layer 3350a, and the second metal layer 3360a are disposed may be defined as the external pad bonding area PA.

Input-output pads 33205 and 3305 may be disposed in the external pad bonding area PA. Referring to FIG. 19, a lower insulating film 3201 covering a lower surface of the first substrate 3210 may be formed below the first substrate 3210, and a first input-output pad 3205 may be formed on the lower insulating film 3201. The first input-output pad 3205 may be connected to at least one of the plurality of circuit elements 3220a, 3220b, and 3220c disposed in the peripheral circuit region PERI through a first input-output contact plug 3203, and may be separated from the first substrate 3210 by the lower insulating film 3201. In addition, a side insulating film may be disposed between the first input-output contact plug 3203 and the first substrate 3210 to electrically separate the first input-output contact plug 3203 and the first substrate 3210.

Referring to FIG. 19, an upper insulating film 3301 covering the upper surface of the second substrate 3310 may be formed on the second substrate 3310, and a second input-output pad 3305 may be disposed on the upper insulating layer 3301. The second input-output pad 3305 may be connected to at least one of the plurality of circuit elements 3220a, 3220b, and 3220c disposed in the peripheral circuit region PERI through a second input-output contact plug 3303. In example embodiments, the second input-output pad 3305 is electrically connected to a circuit element 3220a.

According to example embodiments, the second substrate 3310 and the common source line 3320 may not be disposed in an area in which the second input-output contact plug 3303 is disposed. Also, the second input-output pad 3305 may not overlap the word lines 3330 in the third direction (the Z-axis direction). Referring to FIG. 19, the second input-output contact plug 3303 may be separated from the second substrate 3310 in a direction, parallel to the upper surface of the second substrate 3310, and may pass through the interlayer insulating layer 3315 of the cell region CELL to be connected to the second input-output pad 3305.

According to example embodiments, the first input-output pad 3205 and the second input-output pad 3305 may be selectively formed. For example, the memory device 2226 may include only the first input-output pad 3205 disposed on the first substrate 3210 or the second input-output pad 3305 disposed on the second substrate 3310. Alternatively, the memory device 2226 may include both the first input-output pad 3205 and the second input-output pad 3305.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 2226 may include a lower metal pattern 3273a, corresponding to an upper metal pattern 3372a formed in an uppermost metal layer of the cell region CELL, and having the same cross-sectional shape as the upper metal pattern 3372a of the cell region CELL so as to be connected to each other, in an uppermost metal layer of the peripheral circuit region PERI. In the peripheral circuit region PERI, the lower metal pattern 3273a formed in the uppermost metal layer of the peripheral circuit region PERI may not be connected to a contact. Similarly, in the external pad bonding area PA, an upper metal pattern 3372a, corresponding to the lower metal pattern 3273a formed in an uppermost metal layer of the peripheral circuit region PERI, and having the same shape as a lower metal pattern 3273a of the peripheral circuit region PERI, may be formed in an uppermost metal layer of the cell region CELL.

The lower bonding metals 3271b and 3272b may be formed on the second metal layer 3240b in the word line bonding area WLBA. In the word line bonding area WLBA, the lower bonding metals 3271b and 3272b of the peripheral circuit region PERI may be electrically connected to the upper bonding metals 3371b and 3372b of the cell region CELL by a Cu-to-Cu bonding.

Further, in the bit line bonding area BLBA, an upper metal pattern 3392, corresponding to a lower metal pattern 3252 formed in the uppermost metal layer of the peripheral circuit region PERI, and having the same cross-sectional shape as the lower metal pattern 3252 of the peripheral circuit region PERI, may be formed in an uppermost metal layer of the cell region CELL. A contact may not be formed on the upper metal pattern 3392 formed in the uppermost metal layer of the cell region CELL.

In example embodiments, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

One or more of the elements disclosed above may include or be implemented in one or more processing circuitries such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A method of link startup of a device comprising a plurality of lanes, the method comprising:
    setting up data communication through a connected transmission lane and a connected reception lane from among the plurality of lanes;
    setting a length of an activate period, in which a line of the connected transmission lane has a negative differential line voltage (DIF-N), to be less than a first time period;
    transmitting, by the connected transmission lane, the activate period which is less than the first time period to the connected reception lane;
    receiving, by the connected reception lane, the activate period being less than the first time period;
    determining the activate period is less than the first time period; and
    performing the link startup in a high-speed mode through the connected transmission lane and the connected reception lane, based on the activate period being less than the first time period.

2. The method of claim 1, wherein the first time period is set to be 0.9 ms.

3. The method of claim 1, wherein the first time period is set to be 1.6 ms.

4. The method of claim 1, further comprising:
    setting the length of the activate period of the connected transmission lane to be greater than the first time period;
    transmitting, by the connected transmission lane, the activate period greater than the first time period to the connected reception lane;
    receiving, by the connected reception lane, the activate period greater than the first time period; and
    performing the link startup in a low-speed mode through the connected transmission lane and the connected reception lane, based on the activate period greater than the first time period.

5. The method of claim 1, wherein the transmitting, by the connected transmission lane, of the activate period being less than the first time period to the connected reception lane comprises entering, by a first device connected to the connected transmission lane, the high-speed mode.

6. The method of claim 1, wherein the receiving, by the connected reception lane, of the activate period being less than the first time period comprises entering, by a second device connected to the connected reception lane, the high-speed mode.

7. The method of claim 1, wherein the receiving, by the connected reception lane, of the activate period being less than the first time period comprises:
    exiting, by a second device connected to the connected reception lane, a hibernation (HIBERN8) state, which is a power saving state;
    resetting attributes of physical layers of an interconnect unit of the second device to default values; and
    entering, by the second device, the high-speed mode.

8. The method of claim 1, wherein the performing of the link startup in the high-speed mode through the connected transmission lane and the connected reception lane comprises:
    performing a first trigger event, in which a first device connected to the connected transmission lane transmits a physical lane number of the connected transmission lane to a second device connected to the connected reception lane, and in which the second device transmits a physical lane number of the connected reception lane to the first device;
    performing a second trigger event, in which the first device transmits information of connected transmission lanes to the second device, and in which the second device transmits information of connected reception lanes to the first device; and
    performing a third trigger event, in which the first device transmits logical lane numbers of the connected transmission lanes to the second device, and in which the second device transmits logical lane numbers of the connected reception lanes to the first device.

9. The method of claim 8, further comprising, before the performing of the first trigger event, resetting attributes of physical layers of an interconnect unit of the first device to default values, and resetting attributes of physical layers of an interconnect unit of the second device to default values.

10. The method of claim 8, further comprising:
after the performing of the third trigger event, exchanging, by the first device and the second device, capability information with each other, and recognizing, by the first device and the second device, the capability information of each other; and
exchanging, by the first device and the second device, control frames indicating that initial data frames transmitted between the first device and the second device are correctly received, with each other, and recognizing, by the first device and the second device, the control frames of each other.

11. A method of link startup between a first device and a second device, which are connected to each other through a plurality of lanes, the method comprising:
transitioning, by the first device, a line of at least one of the plurality of lanes from a zero differential line voltage (DIF-Z) state to a negative differential line voltage (DIF-N) state;
monitoring, by the second device, whether there is a lane transited from the DIF-Z state to the DIF-N state;
recognizing, by the second device, a connected lane transited from the DIF-Z state to the DIF-N state, as a result of the monitoring; and
performing the link startup between the first device and the second device in a high-speed mode, based on the connected lane being recognized as transiting from the DIF-Z state to the DIF-N state.

12. The method of claim 11, further comprising, by the first device, transitioning the connected lane from the DIF-Z state to the DIF-N state and exiting a hibernation (HIBERN8) state, which is a power saving state.

13. The method of claim 11, wherein the performing of the link startup between the first device and the second device in the high-speed mode comprises:
performing a first trigger event, in which the first device transmits a physical lane number of the connected lane in the first device to the second device, and in which the second device transmits a physical lane number of the connected lane in the second device to the first device;
performing a second trigger event, in which the first device transmits information of connected lanes in the first device to the second device, and in which the second device transmits information of connected lanes in the second device to the first device; and
performing a third trigger event, in which the first device transmits logical lane numbers of the connected lanes in the first device to the second device, and in which the second device transmits logical lane numbers of the connected lanes in the second device to the first device.

14. The method of claim 13, further comprising, before the performing the first trigger event, resetting attributes of physical layers of an interconnect unit of the first device to default values, and resetting attributes of physical layers of an interconnect unit of the second device to default values.

15. The method of claim 13, further comprising:
after the performing the third trigger event, exchanging, by the first device and the second device, capability information with each other, and recognizing, by the first device and the second device, the capability information of each other; and
exchanging, by the first device and the second device, control frames indicating that initial data frames transmitted between the first device and the second device are correctly received, with each other, and recognizing, by the first device and the second device, the control frames of each other.

16. A device comprising:
an interface configured to transmit and receive data through an interconnect unit to which a plurality of lanes are connected;
a plurality of transmitters comprised in the interconnect unit, at least one of the plurality of transmitters being configured to perform data communication through a connected transmission lane and a connected reception lane from among the plurality of lanes and transmit an activate period of the connected transmission lane, which is less than a first time period, to the connected reception lane, and a line of the connected transmission lane, in the activate period, having a negative differential line voltage (DIF-N); and
a plurality of receivers comprised in the interconnect unit,
wherein the device is configured to determine the activate period is less than the first time period and perform link startup in a high-speed mode through the connected transmission lane and the connected reception lane, based on the activate period being determined less than the first time period.

17. The device of claim 16, wherein the first time period is set to be 0.9 ms.

18. The device of claim 16, wherein the first time period is set to be 1.6 ms.

19. The device of claim 16, wherein at least one of the plurality of transmitters is configured to transmit the activate period of the connected transmission lane, which is greater than the first time period, to the connected reception lane, and
the device is further configured to perform the link startup in a low-speed mode through the connected transmission lane and the connected reception lane, based on the activate period greater than the first time period.

20. The device of claim 16, wherein the device is further configured to:
exit a hibernation (HIBERN8) state, which is a power saving state, when the connected transmission lane transits to the DIF-N state; and
enter the high-speed mode, when the connected transmission lane is in the activate period less than the first time period.

* * * * *